United States Patent
Roberts et al.

(10) Patent No.: US 10,474,708 B2
(45) Date of Patent: Nov. 12, 2019

(54) ENTITY-CENTRIC KNOWLEDGE DISCOVERY

(71) Applicant: Diffeo, Inc., Cambridge, MA (US)

(72) Inventors: Daniel Adam Roberts, Cambridge, MA (US); Max Kleiman-Weiner, Cambridge, MA (US); John Randolph Frank, Cambridge, MA (US); Brian Andrew Olson, Medford, MA (US); David Zachary Maze, Somerville, MA (US); Andrew Richard Gallant, Westborough, MA (US); Joshua Joseph Marco Belanich, Somerville, MA (US); Thomas Michael DuBois, Columbia, MD (US)

(73) Assignee: Diffeo, Inc., Cambridge, MA (US)

( * ) Notice: Subject to any disclaimer, the term of this patent is extended or adjusted under 35 U.S.C. 154(b) by 438 days.

(21) Appl. No.: 15/055,984

(22) Filed: Feb. 29, 2016

(65) Prior Publication Data
US 2016/0378855 A1    Dec. 29, 2016

Related U.S. Application Data

(63) Continuation of application No. 14/710,342, filed on May 12, 2015, now Pat. No. 9,275,132.
(Continued)

(51) Int. Cl.
*G06F 16/338* (2019.01)
*G06F 16/248* (2019.01)
(Continued)

(52) U.S. Cl.
CPC .......... *G06F 16/338* (2019.01); *G06F 16/248* (2019.01); *G06F 16/24578* (2019.01);
(Continued)

(58) Field of Classification Search
CPC ......... G06F 17/30696; G06F 17/30554; G06F 17/30646; G06F 17/30395
(Continued)

(56) References Cited

U.S. PATENT DOCUMENTS 5,659,732 A * 8/1997 Kirsch ................. G06F 16/951
5,748,954 A * 5/1998 Mauldin ............... G06F 16/951
(Continued)

FOREIGN PATENT DOCUMENTS

WO   WO-2002054292    7/2002
WO   WO-2003005235    1/2003
(Continued)

OTHER PUBLICATIONS

EPO, "EP Application Serial No. 15792362.4, Extended Search Report dated Sep. 6, 2017", 9 pages.
(Continued)

*Primary Examiner* — Sheree N Brown
(74) *Attorney, Agent, or Firm* — Strategic Patents, P.C.

(57) ABSTRACT

A user interface of an entity-centric knowledge discovery system presents an entity profile including a mix of structured and unstructured data relating to an entity. As a user refines the entity profile based on information gathered from various sources, the changing entity profile can be used as a substantially continuously updating query to search, retrieve, and rank new and pertinent information specifically relevant to the profiled entity. The platform described herein provide an active loop for refining an entity description and searching for additional information in which human input and machine-based algorithms can cooperate to more quickly build a comprehensive description of an entity of interest.

20 Claims, 8 Drawing Sheets

Related U.S. Application Data

(60) Provisional application No. 62/070,549, filed on Aug. 28, 2014, provisional application No. 61/996,575, filed on May 12, 2014.

(51) Int. Cl.
*G06F 16/33* (2019.01)
*G06F 16/951* (2019.01)
*G06F 16/332* (2019.01)
*G06F 16/2457* (2019.01)

(52) U.S. Cl.
CPC ........ *G06F 16/334* (2019.01); *G06F 16/3326* (2019.01); *G06F 16/3349* (2019.01); *G06F 16/951* (2019.01)

(58) Field of Classification Search
USPC .......................................................... 707/758
See application file for complete search history.

(56) References Cited

U.S. PATENT DOCUMENTS

| | | | | |
|---|---|---|---|---|
| 5,764,906 | A * | 6/1998 | Edelstein | H04L 29/06 709/219 |
| 5,836,771 | A * | 11/1998 | Ho | G09B 5/00 434/362 |
| 5,873,107 | A * | 2/1999 | Borovoy | G06F 17/276 715/234 |
| 5,884,302 | A | 3/1999 | Ho | |
| 5,924,090 | A * | 7/1999 | Krellenstein | G06F 16/338 |
| 5,934,910 | A | 8/1999 | Ho et al. | |
| 6,112,203 | A * | 8/2000 | Bharat | G06F 17/218 |
| 6,138,113 | A * | 10/2000 | Dean | G06F 16/951 715/208 |
| 7,401,057 | B2 * | 7/2008 | Eder | G06N 5/022 706/20 |
| 7,962,500 | B2 * | 6/2011 | van Zwol | G06F 16/58 707/758 |
| 8,122,019 | B2 | 2/2012 | Sjogreen et al. | |
| 8,402,029 | B2 | 3/2013 | Valdes-Perez et al. | |
| 8,429,173 | B1 * | 4/2013 | Rosenberg | G06F 16/5866 707/748 |
| 8,533,223 | B2 * | 9/2013 | Houghton | G06F 17/241 707/776 |
| 8,543,649 | B2 * | 9/2013 | Gilmour | G06F 21/6245 709/206 |
| 8,577,911 | B1 | 11/2013 | Stepinski et al. | |
| 8,635,197 | B2 * | 1/2014 | Chaturvedi | G06F 17/00 707/694 |
| 8,949,204 | B2 * | 2/2015 | Chaturvedi | G06F 17/00 707/694 |
| 9,047,278 | B1 * | 6/2015 | Mann | G06F 16/00 |
| 2003/0187844 | A1 * | 10/2003 | Li | G06F 16/583 |
| 2007/0067285 | A1 * | 3/2007 | Blume | G06F 17/278 |
| 2007/0130126 | A1 * | 6/2007 | Lucovsky | G06Q 30/02 |
| 2007/0198948 | A1 * | 8/2007 | Toriyama | A63F 13/005 715/790 |
| 2007/0214114 | A1 * | 9/2007 | Liu | G06F 16/58 |
| 2008/0104103 | A1 * | 5/2008 | Adams | G06F 16/951 |
| 2008/0222105 | A1 * | 9/2008 | Matheny | G06F 16/9535 |
| 2009/0019031 | A1 | 1/2009 | Krovitz et al. | |
| 2009/0290813 | A1 * | 11/2009 | He | G06K 9/6255 382/305 |
| 2009/0297050 | A1 * | 12/2009 | Li | G06K 9/00684 382/225 |
| 2011/0029559 | A1 * | 2/2011 | Kikuchi | G06F 16/951 707/770 |
| 2011/0085739 | A1 * | 4/2011 | Zhang | G06F 16/58 382/218 |
| 2011/0313990 | A1 * | 12/2011 | Valdes-Perez | G06F 16/285 707/706 |
| 2012/0036125 | A1 * | 2/2012 | Al-Kofahi | G06Q 10/10 707/728 |
| 2013/0080457 | A1 * | 3/2013 | Narayanan | H04W 4/021 707/758 |
| 2013/0138661 | A1 * | 5/2013 | Lu | G06F 1/00 707/748 |
| 2013/0138669 | A1 * | 5/2013 | Lu | G06N 3/088 707/758 |
| 2013/0346396 | A1 * | 12/2013 | Stamm | G06F 16/9535 707/722 |
| 2014/0129535 | A1 * | 5/2014 | Riley | G06F 16/248 707/706 |
| 2014/0173426 | A1 * | 6/2014 | Huang | G06F 17/24 715/256 |
| 2015/0324454 | A1 | 11/2015 | Roberts et al. | |

FOREIGN PATENT DOCUMENTS

| | | |
|---|---|---|
| WO | WO-2005111868 | 1/2006 |
| WO | WO-2006031741 | 3/2006 |
| WO | WO-2006035196 | 4/2006 |
| WO | WO-2012109083 | 8/2012 |
| WO | WO-2015175548 | 11/2015 |

OTHER PUBLICATIONS

WIPO, "PCT Application No. PCT/US15/30400 International Preliminary Report on Patentability dated Nov. 24, 2016", 7 pages.
Winkler, Rolfe, "Getting More than Just Words in a Google Search Result", The Wall Street Journal, Aug. 19, 2014, 1 Page.
"Help: Infobox", Wikipedia—https://en.wikipedia.org/wiki/help:infobox Mar. 5, 2015, 6 Pages.
"Greasemonkey", Wikipedia—http://en.wikipedia.org/wiki/greasemonkey Mar. 28, 2005, 5 Pages.
KBA, "TREC KBA 2014: Accelerate & Create", TREC Knowledge Base Acceleration; KBA a TREC evaluation, 2014, 1 Page.
KBA, "TREC KBA 2014: Overview", TREC Knowledge Base Acceleration; KBA a TREC evaluation, 2014, 3 Pages.
KBA, "TREC KBA 2014: Streaming Slot Filling", TREC Knowledge Base Acceleration; KBA a TREC evaluation, 2014, 3 Pages.
KBA, "TREC KBA 2014: Technical Details", TREC Knowledge Base Acceleration 2014, 2 Pages.
KBA, "TREC KBA 2014: Vital Filtering", TREC Knowledge Base Acceleration; KBA a TREC evaluation, 2014, 4 pages.
"VisualEditor", MediaWiki.org—https://www.mediawiki.org/wiki/visualeditor May 15, 2011, 4 pages.
"Recommender System", Wikipedia—https://en.wikipedia.org/wiki/recommender_systems, May 2, 2015, 13 Pages.
"Wikipedia: User Scripts", Wikipedia—http://en.wikipedia.org/wiki/wikipedia:user_scripts, May 2, 2015, 26 Pages.
"Office Assistant", Wikipedia—https://en.wikipedia.org/wiki/office_assistant May 11, 2015, 6 Pages.
USPTO, "U.S. Appl. No. 14/710,342, Non-Final Office Action dated Jun. 16, 2015", 19 pages.
USPTO, "U.S. Appl. No. 14/710,342, Final Office Action dated Nov. 10, 2015", 20 pages.
USPTO, "U.S. Appl. No. 14/710,342, Notice of Allowance dated Jan. 15, 2016", 17 pages.
U.S. Searching Authority, "International Application Serial No. PCT/US15/30400, Search Report and Written Opinion dated Aug. 27, 2015", 9 pages.
EPO, "EP Application Serial No. 15792362.4 Communication Pursuant to Article 94(3) dated Sep. 24, 2018", 8 pages.

* cited by examiner

ENTITY-CENTRIC KNOWLEDGE DISCOVERY

RELATED APPLICATIONS

This application is a continuation of U.S. application Ser. No. 14/710,342 filed on May 12, 2015, which claims the benefit of U.S. Prov. App. No. 61/996,575 filed May 12, 2014, and U.S. Prov. App. No. 62/070,549 filed Aug. 28, 2014, each of which is hereby incorporated by reference in its entirety.

TECHNICAL FIELD

The present disclosure generally relates to entity-centric knowledge discovery.

BACKGROUND

Many information retrieval tasks are entity-centric, and focus on particular types of entities with well-known and strongly typed attributes. For example an entity such as a company may have a number of employees, a stock symbol, a business address, a quarterly earnings date, and numerous other known attributes involving dates, dollar amounts, geographic locations, and so forth. Similarly, a person may be characterized by a birthday, a home address, a social graph, and so forth. Searching for new information about an entity from among unstructured or semistructured data requires attention to both the description of the entity and the content of documents that are retrieved in response to this description. While tools such as foldering trees have been developed to help gather and sort this type of information, there remains a need for improved tools for a user to discover and gather data into a profile for an entity.

SUMMARY

A user interface of an entity-centric knowledge discovery system presents an entity profile including a mix of structured and unstructured data relating to an entity. As a user refines the entity profile based on information gathered from various sources, the changing entity profile can be used as a substantially continuously updating query to search, retrieve, and rank new and pertinent information specifically relevant to the profiled entity. The platform described herein provide an active loop for refining an entity description and searching for additional information in which human input and machine-based algorithms can cooperate to more quickly build a comprehensive description of an entity of interest.

In one aspect, a computer program product having computer executable code embodied in a non-transitory computer readable medium that, when executing on one or more computing devices, performs the following steps: providing a first window in a display that accepts user input of a profile containing information about an entity including one or more values for one or more distinguishing attributes of the entity; and providing a second window in the display concurrently visible with the first window, where the second window shows a plurality of search results from one or more sources that identify documents each containing a mention with a predetermined likelihood of referring to the entity. The second window may display the search results in an order ranked using an algorithm that preferentially ranks at least one of the search results relative to other ones of the plurality of search results according to one or more predetermined criteria. The code may also perform the step of displaying content of one of the search results as an item in the display, where the first window is responsive to a user selection of the item by adding the item to the first window, thereby providing a change in the profile, and further where the second window is responsive to the change in the profile by offering an updated search result.

Implementations may have one or more of the following features. One of the distinguishing attributes may be a name for the entity. Offering the updated search result may include presenting the updated search result in the display, presenting the updated search result in response to a user action to save the change, presenting the updated search result in response to a user action requesting the updated search result, or presenting an indication in the display of an availability of the updated search result. The code may also perform the step of determining a type for the entity, the type having a predetermined schema that organizes a plurality of attributes for the type including the one or more distinguishing attributes. The code may also perform the step of providing an indication of the updated search result in the display. The indication of the updated search result may include at least one of a presentation of the updated search result in the second window, and a presentation of a notification to the user that the updated search result is available. The code may also perform the step of receiving a user request to display the updated search results and responsively presenting the updated search results in the display. The one or more predetermined criteria may include one or more of: a likelihood that the search result refers to the entity, a likelihood that the search result provides a new item of information about the entity, and a relevance of the search result to the entity. The code may also perform the step of ranking the search results based upon the one or more predetermined criteria using a ranking function that varies according to a state of the profile. The profile may include: one or more hyperlinks; one or more explicit fields; and plain text. The entity may include a person, a corporation, an organization, or a chemical composition. The user selection of data may include a drag and drop of the item to the first window. The drag and drop may: create a citation for the change in the profile, where the citation references the one of the search results associated with the user selection; create a wiki reference tag for the change in the profile, where the wiki reference tag references the one of the search results containing the user selection; and/or create a text entry in the profile corresponding to a selected text entry in the item. The code may also perform the step of displaying the item with highlighting of mentions of the entity in the item. The code may also perform the step of displaying the item with highlighting of new information about the entity in the item. The second window may be responsive to a user selection of information from the first window to update a search result in the second window according to an inferred indication of user interest in the information. The first window may include: a text editing tool; a hypertext markup language (HTML) editing tool; and/or a wiki editing tool. The profile may include: a semistructured document; unstructured data about the entity; structured data about the entity; data having a pre-defined data model; data without a pre-defined data model; fielded data; semantically tagged data; data with an implied structure that is not formally defined within the profile; and/or an editable document including one or more of a text document and an HTML document. The code may also perform the step of displaying the item in a third window configured to display a selected one of the search results from the second window.

In another aspect, a device including a processor, a network interface, and a memory storing computer executable instructions that, when executing on the processor, perform the steps of: providing a first window in a display that accepts user input of a profile containing information about an entity including one or more values for one or more distinguishing attributes of the entity; and providing a second window in the display concurrently visible with the first window, where the second window shows a plurality of search results from one or more sources that identify documents each containing a mention with a predetermined likelihood of referring to the entity. The second window may display the search results in an order ranked using an algorithm that preferentially ranks at least one of the search results relative to other ones of the plurality of search results according to one or more predetermined criteria. The computer executable instructions may also display content of one of the search results as an item in the display, where the first window is responsive to a user selection of the item by adding the item to the first window, thereby providing a change in the profile, and further where the second window is responsive to the change in the profile by offering an updated search result.

In yet another aspect, a method includes: providing a first window in a display that accepts user input of a profile containing information about an entity including one or more values for one or more distinguishing attributes of the entity; providing a second window in the display concurrently visible with the first window, where the second window shows a plurality of search results from one or more sources that identify documents each containing a mention with a predetermined likelihood of referring to the entity. The second window may display the search results in an order ranked using an algorithm that preferentially ranks at least one of the search results relative to other ones of the plurality of search results according to one or more predetermined criteria. The method may also include displaying content of one of the search results as an item in the display, where the first window is responsive to a user selection of the item by adding the item to the first window, thereby providing a change in the profile, and further where the second window is responsive to the change in the profile by offering an updated search result.

In one aspect, a computer program product including computer executable code embodied in a non-transitory computer readable medium that, when executing on one or more computing devices, performs the steps of: providing a first window in a display that accepts user input of a profile containing information about an entity including one or more values for one or more distinguishing attributes of the entity; and providing a second window in the display concurrently visible with the first window, where the second window shows a plurality of search results from one or more sources that identify documents each containing a mention with a predetermined likelihood of referring to the entity, and where the second window displays the search results in an order ranked using an algorithm that preferentially ranks at least one of the search results relative to other ones of the plurality of search results according to one or more predetermined criteria. The code may also perform the step of providing a third window in the display concurrently visible with the first window and the second window, the third window displaying content of one of the search results, where the first window is operatively coupled to the third window to receive a user selection of selected data from the third window and to place the selected data into the first window thereby providing a change in the profile, where the second window is responsive to a change in the profile to update the search results, and where the third window is responsive to a selection of a selected one of the search results in the second window to display content of the selected one of the search results in the third window.

In another aspect, a method includes: storing an entity profile in an editable document containing semistructured data including a first datum having a pre-defined data model and a second datum without a pre-defined data model, the entity profile describing an entity with a type having a predetermined schema that includes one or more distinguishing attributes of the entity, and a value for at least one of the one or more distinguishing attributes; displaying the entity profile to a user in a user interface; detecting a user modification to the entity profile in the user interface resulting in a modified entity profile; automatically performing an entity-based search in response to the user modification for mentions of the entity specified in the modified entity profile, thereby retrieving one or more search results; and displaying the one or more search results to a user.

Implementations may have one or more of the following features. The method may also include ranking one of the search results according to a level of confidence that the search result refers to the entity. The method may further include ranking one of the search results according to a level of confidence that the search result provides a new item of information about the entity. The entity profile may include one or more of: hyperlinks, explicit fields, and plain text. The entity may include a person, a corporation, an organization, or a chemical composition. The user modification may include a drag and drop of data into the editable document. The drag and drop may: create a citation for the data referencing a source of the data; create a wiki reference tag for the data referencing a source of the data; and/or creates a text entry in the entity profile corresponding to a selected text entry in a content source. The one or more search results may include highlighting of mentions of the entity in the one or more search results, and/or highlighting of a new item of information in the one or more search results. The user modification may include a user selection of information in the entity profile thereby providing an inferred indication of user interest in the information. The user interface may include one or more of: a text editing tool for the editable document, a hypertext markup language (HTML) editing tool for the editable document, and a wiki editing tool for the editable document. The entity profile may include: unstructured data about the entity, structured data about the entity, fielded data, semantically tagged data, and/or data with an implied structure that is not formally defined within the entity profile. The editable document may include one or more of a text document and an HTML document.

In yet another aspect, a computer program product for providing a live search document, the computer program product comprising computer executable code embodied in a non-transitory computer readable medium that, when executing on one or more computing devices, performs the steps of: storing an entity profile in an editable document containing semistructured data including a first datum having a pre-defined data model and a second datum without a pre-defined data model, the entity profile describing an entity with a type having a predetermined schema that includes one or more distinguishing attributes of the entity, and a value for at least one of the one or more distinguishing attributes; displaying the entity profile to a user in a user interface; detecting a user modification to the entity profile in the user interface resulting in a modified entity profile;

automatically performing an entity-based search in response to the user modification for mentions of the entity specified in the modified entity profile, thereby retrieving one or more search results; and displaying the one or more search results to a user.

In one aspect, a system includes: a memory storing an entity profile for an entity having a predetermined type; a search engine configured to perform entity-based searching that locates possible mentions of the entity in a source of documents based upon the entity profile; a display configured to display the entity profile and one or more documents containing possible mentions of the entity to a user; and a processor configured to detect a user input modifying the entity profile into a modified entity profile, to present a search request to the search engine based on the modified entity profile, and to display a result of the search request in the display.

Implementations may have one or more of the following features. The processor may automatically detect the user input, and automatically present the search request and displays the result in response to the user input. The processor may receive a manual request from the user to present the search request based on the modified entity profile. The search engine may be configured to rank search results included in the result of the search request according to a level of confidence that the search results refer to the entity. The search engine may be configured to rank search results included in the result of the search request according to a level of confidence that the search results provide a new item of information for the entity. The entity profile may include: one or more hyperlinks, one or more explicit fields, and/or plain text. The entity may include a person, a corporation, an organization, or a chemical composition. The user input may include a drag and drop of data from the one or more documents into the entity profile. The drag and drop may: a citation for the modified entity profile, where the citation references the one or more documents containing the data; create a wiki reference tag for the modified entity profile, where the wiki reference tag references the one or more documents containing the data; and/or create a text entry in the modified entity profile corresponding to a selected text entry from the one or more documents. The one or more documents may include highlighting of mentions of the entity and/or highlighting of a new item of information about the entity. The user input may include a user selection of information within the entity profile thereby providing an inferred indication of user interest in the information. The display may include one or more of a text editing tool, a hypertext markup language (HTML) editing tool, and/or a wiki editing tool. The entity profile may include: a semistructured document, unstructured data about the entity, structured data about the entity, data having a pre-defined data model, data without a pre-defined data model, fielded data, semantically tagged data, data with an implied structure that is not formally defined within the entity profile, and/or an editable document including one or more of a text document and an HTML document.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
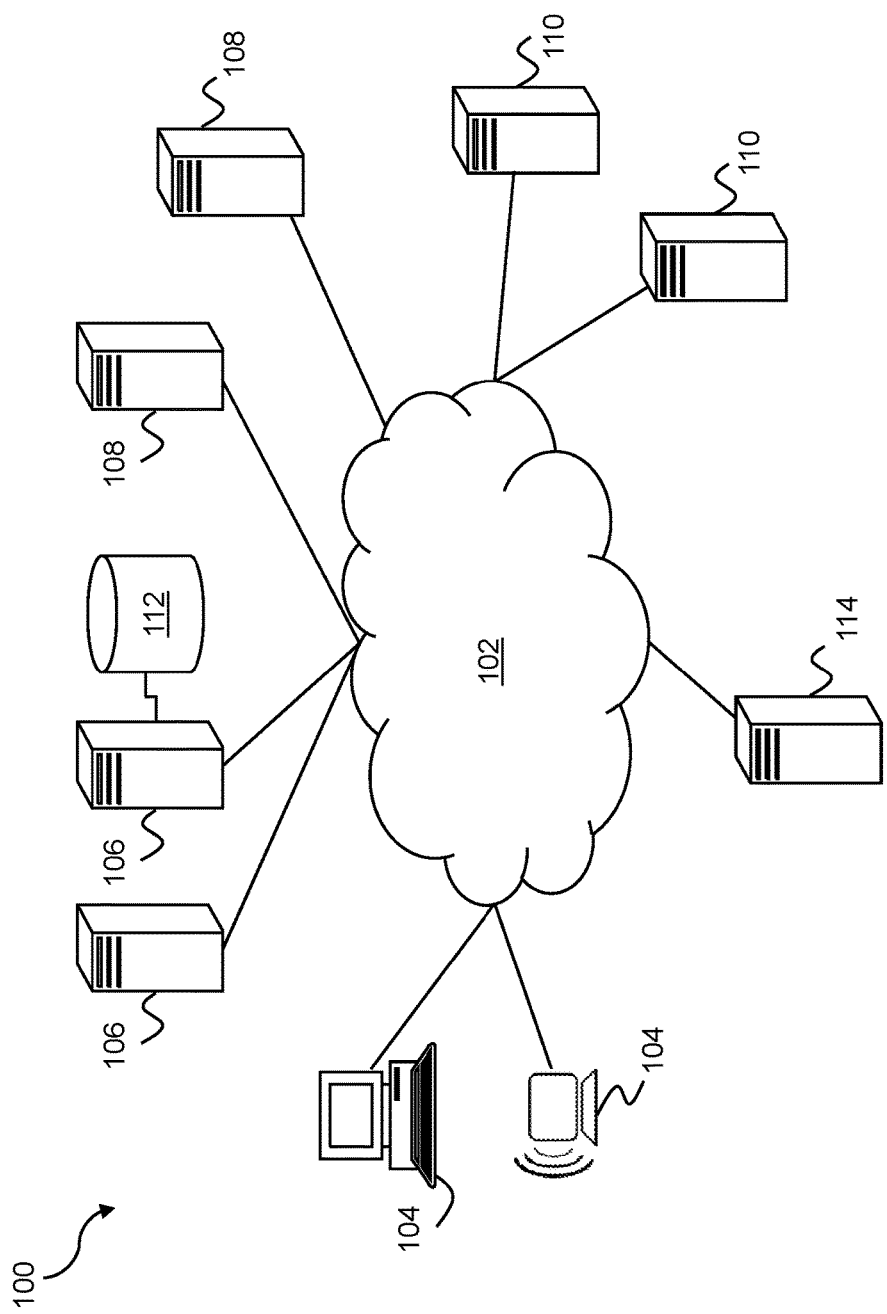
FIG. 1 shows a networked environment for entity-centric information retrieval and aggregation.

FIG. 1 shows a networked environment for entity-centric information retrieval and aggregation. In general, the environment 100 may include a data network 102 interconnecting a plurality of participating devices in a communicating relationship. The participating devices may, for example, include any number of client devices 104, servers 106, content sources 108, and other resources 110.

The data network 102 may be any network(s) or inter-network(s) suitable for communicating data and information among participants in the environment 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The client devices 104 may include any devices within the environment 100 operated by users for practicing the entity-centric information retrieval and aggregation techniques as contemplated herein. Specifically, the client devices 104 may include any device for initiating and conducting searches, gathering information, drafting entity profiles, performing other research tasks, and so forth, as well as managing, monitoring, or otherwise interacting with tools, platforms, and devices included in the systems and methods contemplated herein. By way of example, the client devices 104 may include one or more desktop computers, laptop computers, network computers, tablets, mobile devices, portable digital assistants, messaging devices, cellular phones, smart phones, portable media or entertainment devices, or any other computing devices that can participate in the environment 100 as contemplated herein. As discussed above, the client devices 104 may include any form of mobile device, such as any wireless, battery-powered device, that might be used to interact with the networked environment 100. It will also be appreciated that one of the client devices 104 may coordinate related functions (e.g., searching, storing an entity profile, etc.) as they are performed by another entity such as one of the servers 106, content sources 108 or other resources 110.

Each client device 104 may generally provide a user interface, such as any of the user interfaces described herein. The user interface may be maintained by a locally executing application on one of the client devices 104 that receives data from, e.g., the servers 106 and content sources 108 concerning an entity. In other embodiments, the user interface may be remotely served and presented on one of the client devices 104, such as where a server 106 or one of the other resources 110 includes a web server that provides information through one or more web pages or the like that can be displayed within a web browser or similar client executing on one of the client devices 104. The user interface may in general create a suitable visual presentation for user interaction on a display device of one of the client devices 104, and provide for receiving any suitable form of user input including, e.g., input from a keyboard, mouse, touchpad, touch screen, hand gesture, or other use input device(s).

The servers 106 may include data storage, a network interface, and a processor and/or other processing circuitry. In the following description, where the functions or configuration of a server 106 are described, this is intended to include corresponding functions or configuration (e.g., by programming) of a processor of the server 106. In general, the servers 106 (or processors thereof) may perform a variety of processing tasks related to the entity-centric information retrieval and aggregation techniques discussed herein. For example, the servers 106 may manage information received from one or more of the client devices 104, and provide related supporting functions such as searching and the management of data. The servers 106 may also or instead include backend algorithms that react to actions performed by a user at one or more of the client devices 104. The backend algorithms may also or instead be located elsewhere in the environment 100.

The servers 106 may also include a web server or similar front end that facilitates web-based access by the client devices 104 to the capabilities of the server 106. A server 106 may also or instead communicate with the content sources 108 and other resources 110 in order to obtain information for providing to a user through a user interface on the client device 104. Where the user specifies search criteria such as search-type, language filters, relevance criteria (e.g., for determining relevance of a search result to an entity), confidence criteria (e.g., for determining whether a result relates to a particular entity), and the like, or search criteria is otherwise specified, e.g., through an action performed on an entity profile included on a client device 104, this information may be used by a server 106 (and any associated algorithms) to access other resources such as content sources 108 or other resources 110, to retrieve relevant or new information and re-rank search results. Additional processing may be usefully performed in this context such as recommending new search strategies to a user or recommending potentially new information to the user for addition to an entity profile.

A server 106 may also maintain a database 112 of content, along with an interface for users at the client devices 104 to perform searches and retrieval of database content using any of the techniques provided herein (e.g., automatically through an action performed on an entity profile). Thus, in one aspect, a server 106 (or any system including the server 106) may include a database 112 of entity information, and the server 106 may act as a server that provides a search engine for locating a particular attribute in the database 112, and providing supporting services such as retrieval of documents that are located.

In another aspect, the server 106 may support search activity by periodically searching for content at remote locations on the data network 102 and indexing any resulting content for subsequent search by a client 104. This may include storing location or address information for a particular document as well as parsing the document in any suitable manner to identify words, images, media, metadata and the like, as well as the creation of feature vectors or other derivative data to assist in similarity-type comparisons, dissimilarity comparisons, or other analysis. In one aspect, the database 112 may be manually curated according to any desired standards. The server 106 may provide or otherwise support an interface such as any of the interfaces described herein, which may be served to a user at a client 104.

A server 106 may also or instead be configured to track syndicated content or the like, such as by providing an interface for managing subscriptions to sources of content. This may include tools for searching existing subscriptions, locating or specifying new sources, subscribing to sources of content, and so forth. In one aspect, a server 106 may manage subscriptions and automatically direct new content from these subscriptions to a client device 104 according to input from a user. Thus, while it is contemplated that a client device 104 may autonomously subscribe to sources of content through a network interface and receive new content directly from such sources, it is also contemplated that this feature may be maintained through a remote resource such as a server 106.

The content sources 108 may include any sources of data or information in any structured, semistructured or unstructured format capable of being utilized by the techniques described herein, e.g., to update or refine an entity profile being created by a user. For example, the content sources 108 may include without limitation Web pages (e.g., public or private pages), search engines or search services, interfaces to various search services, application program interfaces (APIs) to remote sources of data, local or remote databases (e.g., private databases, corporate databases, government databases, institutional databases, educational databases, and so forth), libraries, other online resources, social networks, computer programs and applications, other entity profiles, and so forth. The content sources 108 may include various types of information and data including without limitation textual information (e.g., published or unpublished information such as books, journals, periodicals, magazines, newspapers, treatises, reports, legal documents, reporters, dictionaries, encyclopedias, blogs, wikis, and so forth), graphical information (e.g., charts, graphs, tables, and so forth), images or other visual data (e.g., photographs, drawings, paintings, plans, renderings, models, sketches, diagrams, computer-aided designs, and so forth), audio data, numerical data, geographic data, scientific data (e.g., chemical composition, scientific formulas, and so forth), mathematical data, and so forth.

The other resources 110 may include any resources that may be usefully employed in the devices, systems, and methods as described herein. For example, the other resources 110 may include without limitation other data networks, human actors (e.g., programmers, researchers, annotators, editors, and so forth), sensors (e.g., audio or visual sensors), text mining tools, webcrawlers, knowledge base acceleration (KBA) tools or other content monitoring tools, and so forth. The other resources 110 may also or instead include any other software or hardware resources that may be usefully employed in the networked applications as contemplated herein. For example, the other resources 110 may include payment processing servers or platforms used to authorize payment for content subscriptions, content purchases, or otherwise. As another example, the other resources 110 may include social networking platforms that may be used, e.g., to share an entity profile or other research conducted by a user, or as additional sources of entity information. In another aspect, the other resources 110 may include certificate servers or other security resources for third party verification of identity, encryption or decryption of content, and so forth. In another aspect, the other resources 110 may include a desktop computer or the like co-located (e.g., on the same local area network with, or directly coupled to through a serial or USB cable) with one of the client devices 104. In this case, the other resource 110 may provide supplemental functions for the client device 104. Other resources 110 also include supplemental resources such as scanners, cameras, printers, and so forth.

The environment 100 may include one or more web servers 114 that provide web-based access to and from any of the other participants in the environment 100. While depicted as a separate network entity, it will be readily appreciated that a web server 114 may be logically or physically associated with one of the other devices described herein, and may, for example, include or provide a user interface for web access to one of the servers 106 (or databases 112 coupled thereto), one of the content sources 108, or any of the other resources 110 in a manner that permits user interaction through the data network 102, e.g., from a client device 104.

It will be understood that the participants in the environment 100 may include any hardware or software to perform various functions as described herein. For example, one or more of the client device 104 and the server 106 may include a memory and a processor.

The various components of the networked environment 100 described above may be arranged and configured to support the techniques described herein in a variety of ways. For example, in one aspect, a client device 104 connects through the data network 102 to a server 106 that performs a variety of processing tasks related to entity-centric information retrieval and aggregation. For example, the server 106 may host a website that runs an entity-centric information retrieval and aggregation program where a user builds an entity profile that is used as a query for searching, retrieving, and ranking information related to the entity. In this manner, as a user builds the entity profile on an interface displayed on the client device 104, the server 106 may update a search for new and pertinent information related to the entity profile using the content sources 108, other resources 110, or database 112. As discussed in more detail below, the server 106 (or another participant in the environment 100) may include one or more algorithms that define the search and allow the server 106 to react to actions taken on the entity-centric information retrieval and aggregation program, such as revisions made to the entity profile or the selection of information.

Figure 2:
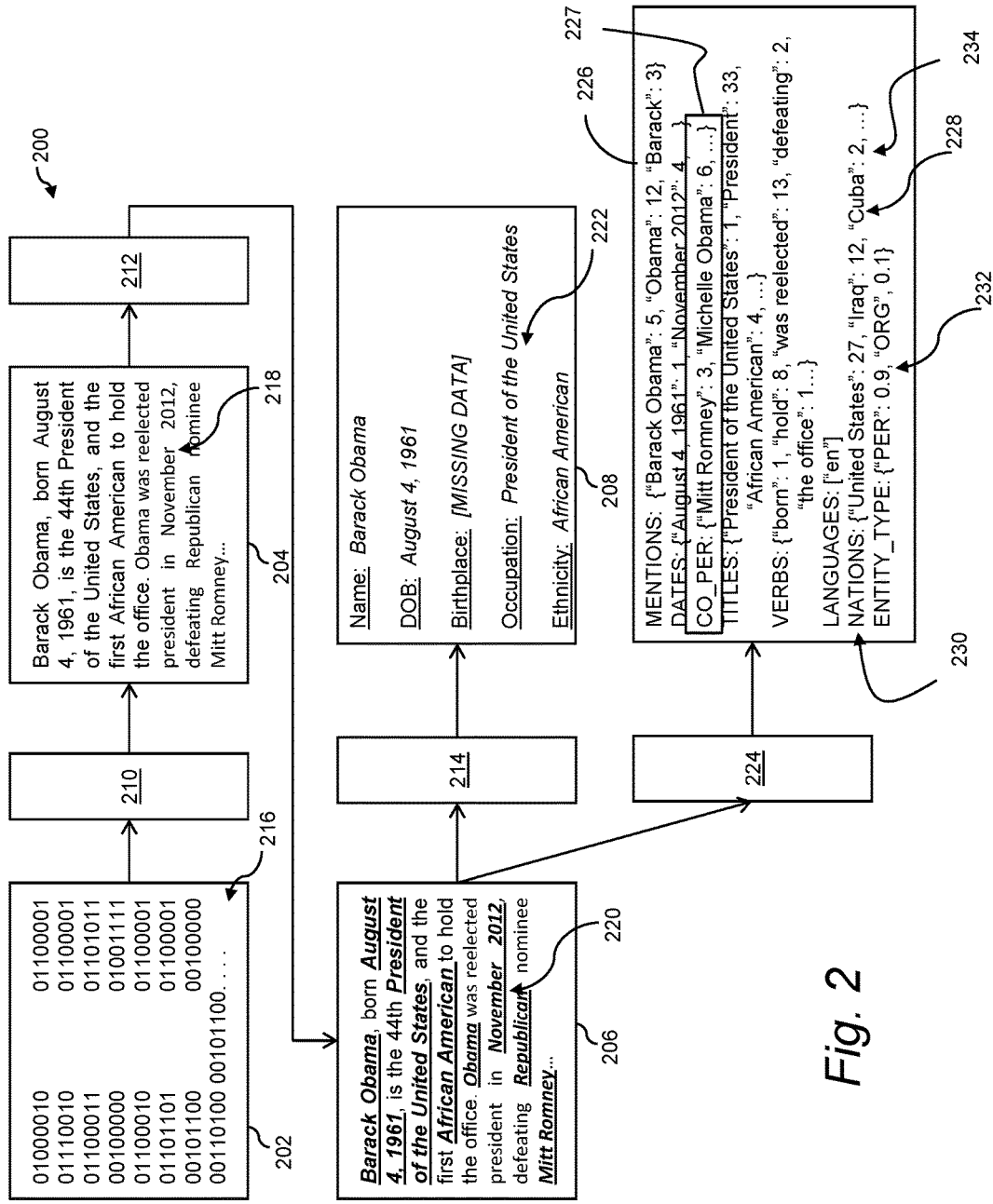
FIG. 2 illustrates the deserialization of data from a binary representation into structured data.

FIG. 2 illustrates the deserialization of data from a binary representation into structured data. In general, "data" may refer to any interpretable content stored or embodied in a computer system. "Unstructured data" may refer to computer-readable media that does not have a pre-defined data model or is not organized in a pre-defined manner. "Structured data" may refer to data with a data model specifying, e.g., a data type, relationship, enumeration, or the like that allows the data to be interpreted by a computer without human intervention or other assistance. "Semistructured data" may refer to data that contains both structured and unstructured data mixed together.

FIG. 2 includes various data representations, i.e., a first data representation 202, a second data representation 204, a third data representation 206, a fourth data representation 208, and a fifth data representation 226, and various tools, i.e., a first tool 210, a second tool 212, a third tool 214, and fourth tool 224

The first data representation 202 may include unstructured data in the form of raw data 216 such as a sequence of bits arranged into an array of bytes or numbers that have not yet been processed or interpreted to assemble a structured representation of the information. The raw data 216 may be suitable for storage in a physical medium such as a file, disk, or addressable memory. The first data representation 202 may therefore include any of the other data types contemplated herein in a raw, physical form.

Raw data 216 may be read into structures, such as displayable symbols (e.g., Unicode characters), enumerable lists or sets, or compound structures such as mappings between strings of symbols and lists. An exemplary form of structure is an enumeration or "enum," which may provide a predetermined and fixed list of possible values for a variable. For example, if a particular variable is defined to take its value from an enum containing the three colors red, green, and blue, a computer program interpreting a piece of data as representing this variable may transform the data into a representation of one of these three colors.

As shown in the figure, the first tool 210 may deserialize the raw data 216 as a first step in a process to provide structure to the raw data 216. It will be understood that the term "tool" as used in this context is intended to refer to any suitable process, executable code, or the like that might be used explicitly or implicitly to process data in the manner described. This may, for example, include explicit function calls by a user, operating system or kernel level processes, protocol stack processes, or any combination of these. In general, the process of converting a raw data representation (or otherwise unstructured data representation) to a structured representation of the same information is often referred to as deserializing, unmarshaling, or loading (where the reverse processes are sometimes referred to as serializing, marshaling, or dumping, respectively). Deserialization may be enabled through the use of one or more tools (e.g., the first tool 216) that convert between a raw data string and a structured data object that represent the same information. Deserialization may occur automatically, i.e. without human intervention to examine the raw data. In general, all raw data 216 is unstructured until an automatic algorithm or the like deserializes parts of the data into structured information.

An example of deserialization includes the deserialization of data sent through a communication medium such as a wire or radio signal as binary data. This data is generally serialized before transmission (along with any other encoding suitable for transmission through the medium), and the receiver deserializes the data in order to regain the structured parts of the message. Another example is data stored on a disk, which is generally serialized into some binary form before saving. The data can then be deserialized into, e.g., ASCII code or some other more structured form.

The output of the first tool 210 may include the second data representation 204. The second data representation 204 can include serialized raw data in the form of unstructured or semistructured data. As shown in the figure, this may include a text string 218 or the like. The output of the first tool 210 may instead include more structured data, such as that shown in the third data representation 206 or fourth data representation 208, but for purposes of illustration these varies degrees and types of structures are separately illustrated.

As discussed above, the text string 218 in the second data representation 204 may be a form of unstructured data consisting of a sequence of Unicode characters or the like. The second data representation 204 may also or instead include other unstructured data such as audio or video media, digitally sampled sensor data, numerical data, and so forth. Unstructured data is often rich in linguistic textual or audio signals, such as blog posts, written reports, email, video recordings, and audio recordings. Unstructured data may more generally include any data that lacks a "schema" (i.e., a description of a structured data representation) or other description or predetermined data model to interpret the data. Text written by humans for other humans to read is a common example of unstructured data. Audio and video recordings are also generally unstructured. Often, a human can use their intellect to interpret unstructured data and provide an assessment of its meaning. In computer-implemented methods such as those discussed herein, an automated system attempts to reproduce this assessment by applying heuristics and algorithms to interpret the data and infer structure that a human might derive from the data. For example, an automatic algorithm may attempt to mark substrings in a text file that correspond to names of people, phone numbers, and so forth.

The text string 218 or other data converted from the raw data 216 may include information regarding an entity as discussed herein. For example, as shown in the figure, the text string 218 may include information such as "Barack Obama, born Aug. 4, 1961, is the 44th President of the United States, and the first African American to hold the office." In this example, Barack Obama is the entity (with the name, "Barak Obama" being a name or identifier for the entity) and the other information in the text string 218 can be considered attribute values as discussed herein, all of which can be used for building an entity profile.

The second tool 212 may in general be combined with or separate from the first tool 210. The second tool 212 may be configured to provide structure to the data in the second data representation 204, e.g., the text string 218. Specifically, the second tool 210 may be configured to recognize structure within the second data representation 204, such as by searching through the text string 218 for entity identifiers, entity mentions, entity attributes, attribute values, and so forth. The output of the second tool 212 may include the third data representation 206. The third data representation 206 can include semistructured or structured data.

As shown in the figure, the third data representation 206 may include semistructured text 220 or the like, where the second tool 212 has recognized information of interest within the text string 218 and applied structure where the structure can be inferred from the context. Specifically, as shown by the bold, underlined text in the third data representation 206, the second tool 212 has recognized the name of an entity, "Barack Obama," a date of birth, "Aug. 4, 1961," an occupation "President of the United States," and an ethnicity, "African American." This information may be fielded, tagged, or otherwise imparted with typing information and other metadata in a number of ways. This information may also or instead be further processed by the third tool 214 to place different types of information into a hierarchy, database, or the like where the information can be stored, e.g., as attribute-value pairs or the like.

It will be noted that the fourth data representation 208 is fully structured. That is, each datum has a data model specifying, e.g., an attribute that the datum provides a value for, a type of the data, and so forth. The type may also vary, and may specify the format of the data (i.e., integer, floating point, text, date, etc.) or a more abstract type information such as a phone number, zip code or the like that implies a particular alphanumeric format and attaches a significance to the value thereof.

Structured data may, for example, include "tagged data," which includes an unstructured component and an associated structured component that describes substrings of the unstructured component. Since unstructured data can include a string of bytes or characters, portions of it may be identified using array index positions in the string. The structured data component may thus provide metadata associated with one or more substrings of the unstructured data. For example, a common type of "tagger" identifies substrings in natural language text that the tagger's algorithms recognize as mentions of entities (e.g., people, organizations, etc.). For each span of characters or bytes selected by such a tagging algorithm, the tagger software may generate metadata that identifies an entity type from a fixed list of predefined entity types. The structured tags may identify the substring and the entity type. Such offset-based labeling of unstructured data is sometimes referred to as standoff tags. Multiple standoff taggings may be generated for the same piece of unstructured data. For example, one tagger might identify mentions of people, and another tagger might analyze the same text to identify substrings as references to geographic locations. In one aspect, the second tool 212 may include any of the foregoing taggers or tagging algorithms.

The foregoing tagging techniques may also be applied to audio, video, and semistructured data. For example, hypertext markup language (HTML) documents may provide formatting and sectioning in addition to unstructured components. Standoff tags for such a semistructured document may first identify a section or other structural element of the Document Object Model (DOM) and further specify a standoff tag within unstructured data contained within that section.

The third tool 214 may be configured to use the data included in the third data representation 206, e.g., to provide further structure to the data, to incorporate the data into a document (e.g., a knowledge base or an entity profile), or to create "fielded data." Fielded data may include structured data that is separated into distinct components. Typically, each distinct component has a schema or data type that instructs machines how to handle and interpret the raw data representation of that field.

The third tool 214 may separate data by data type. Data of a specific type may have the same schema, where the schema can be used to define what one means by "type." Schemas may be specified in many ways, including without limitation, interfaces specified in the Thrift Interface Definition Language, an extensible markup language (XML) schema, column names on a text file formatted in a comma-separated-values (CSV) pattern, and so forth. By way of example, a software program can represent a schema if it reads data and interprets that raw data to construct data structures in-memory or persisted to a storage system. A schema can also be associated with data in many ways, including file name extensions. When data gets separated from its schema or modified so as to no longer allow interpretation using the schema, the data becomes less structured and therefore semistructured or unstructured.

The output of the third tool 214 may include the fourth data representation 208, which can include structured data in the form of fielded data 222.

The third tool 214 may analyze the third data representation 206 to select data to fill different data fields included in the fourth data representation 208. For example, as shown in the figure, the data fields of "Name," "DOB" (i.e., date of birth), "Occupation," and "Ethnicity" have been filled, while the "Birthplace" field has not. Thus, the "Birthplace" field includes missing data, which can be used by a search tool (e.g., one of the tools discussed herein) as a criterion for searching with the goal of filling in this data field.

It will be understood that an entity profile as contemplated herein may include fully structured data as well as unstructured data, or any combination of these, referred to collectively as "semistructured data." This semistructured data may record portions of the source content for which structure can be determined as well as portions of the source content for which no structure can be determined, such as natural language passages that cannot be parsed and tagged with explicit structure. Thus the term semistructured, as used herein, is intended to include any combination and quantity of structured and unstructured data. An in-progress document containing an entity profile with semistructured data may be persisted in a file such as a text document, hypertext document, word processing document or the like using a document identifier that permits storage, recovery, and editing of the file containing the semistructured data of the entity profile.

In addition to explicitly identifying structure within content as described above, techniques may be used to derive metadata that characterizes the content in more abstract forms. Thus for example the fifth data representation 226 may be a feature vector or feature collection constructed automatically from the semistructured output 206 of a tagger process 212. The purpose of a feature vector is to automatically capture aspects of a piece of unstructured or semistructured data in a form that is easily compared to other pieces of data. By comparing two feature collections, a software program can quantify similarities and differences between the two pieces of data represented by the feature collections. By enabling fully automatic comparisons, feature vectors form a core part of many natural language processing and information discovery algorithms.

Feature vectors enable quantitative comparisons by organizing semistructured data into fields that are amenable to comparison. A common type of such a field is a string count vector, which records the number of times that various strings appeared in the text. Various phrases and the like from the third data representation 206 may be recorded in mappings 227 of particular types 230 of data such as entity "MENTIONS", "DATES," relationships to other entities ("CO_PER"), "TITLES," "NATIONS," and so forth. For each such type 230 of data, the mappings 227 may include particular strings 228 and string counts 234. For the purposes of illustration, the mapping 227 may be of text that contains a few sentences from a Wikipedia article for Barack Obama. In practice, an article or other information source may contain many more words and phrases, and the illustration of a feature vector or mapping 227 in the fifth data representation 226 shows example counts for words that might appear in a lengthier source. For example, the word "Cuba" might appear twice in the full article about Barack Obama.

Feature vectors may contain several types of information, such as mentions of the entities name(s), dates that appear near the mentions, co-occurring persons, titles or descriptions, verbs, countries or nations, languages that appear in the text, and more. Such an automatic combination often includes over simplifications, such as labeling "African American" as a "title" rather than an ethnicity or description. Such oversimplifications occur when automatically imposing structure on data. Another type of information that might appear in a feature vector is a probability vector 232, which provides a likelihood for a set of possible values for a single valued attribute. For example, gender and entity type are attributes that have one value for a given entity. Inferring the value for such attribute is a challenging algorithmic task, and automatic systems often generate probabilities for one or more of the possible values rather than a single categorization.

A fully structured representation 208 may require human intervention to extract from tagger output such as the third data representation 206, i.e. the third tool 214 may incorporate human input to resolve ambiguities and so forth. By contrast, the fourth tool that converts the tagger output into feature vectors is preferably fully automated. Like many fully automatic algorithms, it is common for feature vectors to contain errors, such as incorrectly identifying a noun as a verb.

Feature vectors can be constructed for any kind of data. Feature vectors for text typically capture words and phrases and concepts derived from the words and phrases in a document. Feature vectors can also be constructed for audio, video, images, radio signals, temperature profiles, ballistic motion trajectories, and any other form of data that can be recorded for processing by automatic algorithms. The examples provide illustrate these concepts with text, and it will be understood by those skilled in the art that these concepts can be similarity applied to other forms of data.

A search engine is a tool that is common in the art. A search engine enables a user to input information and receive as output information responsive to their input. The input is often called a query or request. The output is often called a "list of results," a "set of results," or the like. The search engine may be said to "retrieve" information for the user, and as such it is an information retrieval tool. Often search engines order the results according to a relevance algorithm. The way in which the output is responsive to the input may depend on the algorithms within the search engine. The form and degree of structure in the input and output may also depend on the particular search engine and can vary considerably in the art, ranging from inputting text to finding images, to inputting structured identifiers to finding text or music, and many more. In principle, any kind of information could be used to search for any other kind of information, because the only constraints may be the algorithms inside the search engine (and these can be general computer programs). The algorithms inside a search engine may decide which results to display and in what order. Typically, search engines can access much more data than any user is able to digest, so the ordering function of search engines enables a user's success in finding useful information. Ordering of search results is also often referred to as "ranking".

Recommendation engines or recommender engines are a broad subcategory of search engines that may differ from other search engines by enabling a different kind of user experience that focuses more on a user activity that is not the search results themselves. For example, many search engines accept explicit user input, such as a keyword search box or drop down lists of search criteria, and in these search tools, the list of search results is often the dominant visual component of the user experience. Google's search engine results page (SERP) is a de facto standard in the art and it illustrates such a search-results-centric experience.

A recommendation engine shifts the focus of the user experience to some other activity, such shopping and the purchasing of products. The search results may be presented alongside this other activity. While the internal algorithm may be quite similar, the mechanism by which the recommendation engine obtains its input may be more oblique compared to traditional search criteria input methods. For example, the shopping cart of products that a user has gathered and is considering purchasing may be used as the input query for retrieving search results. Such search results are often called "recommendations" because the user's intent may not have been to explicitly request the search engine's output.

The implementations contemplated herein can be viewed in both regards, i.e., it may be considered a recommendation engine that presents recommendations while a user views or edits an in-progress document, and it may also be considered a search engine for which the in-progress document is the input query. In general, the implementations contemplated herein may not require a user to be fully aware that the in-progress document is the input query, and the systems described herein can allow the user to operate the search engine more directly by placing special marks in the in-progress document. For example, if the user specifically identifies strongly typed attributes of an entity, such as the entity's name or related entities, then the recommendation engine can react to those improvements to the profile by offering new or improved recommendations.

Figure 3:
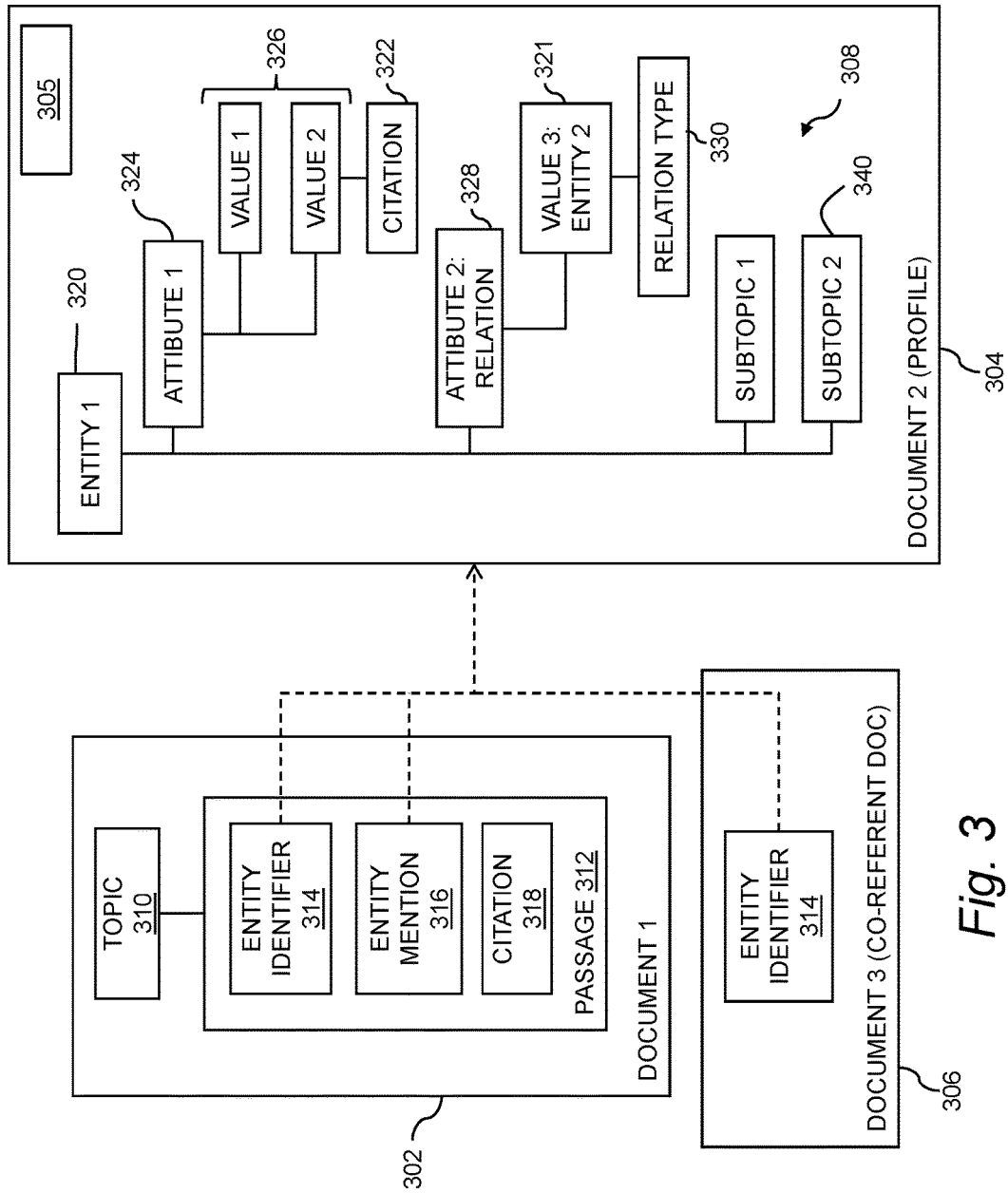
FIG. 3 shows the organization of information into an entity profile.

FIG. 3 shows the organization of information into an entity profile. In general, entity-centric knowledge discovery may rely on searching, aggregating, and storing information about an entity may from a plurality of documents, and FIG. 3 illustrates the relationship among a number of such documents. In the following description, there is a hierarchy of information going from topics to entities to subtopics. As used herein, the term topic refers to any subject matter of interest, and the term "entity" refers to a particular type of topic having strongly typed attributes that distinguish it from other entities. As with topics, a subtopic does not imply any particular structure (although it may have structure), but it is expressly predicated on being about an entity. Some attributes are more distinguishing than others. For example, a person's height and gender are stronger differentiators than the name of a book that the person read in the last two weeks.

The tools and techniques contemplated herein focus on entity-centric information discovery. An entity may be any real-world thing or item with an identifier such as a name (e.g., "John Smith" or "Oxygen") and a type (e.g., person or chemical element, respectively). An entity may thus be a member of a class of objects that have concrete existence in the world, such as persons, places, organizations, companies, buildings, chemical compounds, genes, computer malware, commercial products, hardware, books, music albums, and so on and so forth. Generally, in contrast to topics, entities can be partially distinguished in information retrieval (IR) systems by differentiating attributes, such as birthdate, geographic location, and so on, as well as strongly typed relations to other entities (e.g., the mother of a person is another specific person). For clarity, examples of topics that are not entities include eastern religion (although religious deities are a type of entity), Belgian politics (although the country of Belgium is an entity), sumo wrestling (although a specific world-class sumo wrestler or a specific sumo tournament is an entity), winter gardening (although a plant species is an entity and a specific plant is also an entity), computer security (although a particular computer server or particular software program is an entity) and baking chocolate cookies (although a specific pastry chef or restaurant is an entity).

In general, entities are tangible artifacts that exist in the real world, and thus a computer-based representation of an entity may merely be a description of the real entity that exists in the physical world. As real-world things, entities sometimes participate in events. When given a name, an event can be a type of entity, and may be characterized by temporal attributes.

Entities may also include specific digital artifacts, such as an email message, a video recording, a user account in a computer system, and so on. Such digital entities may lack a physical embodiment, but are entities nonetheless because they have a well-defined type and are distinguished from other entities of the same class by strongly typed attributes, such as the date/time and recipients of the email, or the location and time and camera orientation of the video, or the email address and phone number associated with the user account, to name a few.

Entities may also include electronic devices, tools, products, and implements, such as a specific computer, a brand of camera, a botnet, a specific version of malware software, a family of related malware software, and so on. Such entities may have abstract or multiple physical embodiments, but are entities nonetheless because they have a well-defined type and are distinguished from other entities of that same class by strongly typed attributes, such as the MAC address or IP address of the computer, the part number of the camera brand, the owner and command and control nodes of the botnet, the MD5 hash of the malware, or the collection of attributes and hashes of a family of malware, to name a few.

Often, an entity may be represented by a document, which is referred to herein as an "entity profile" or simply a "profile." This profile may include, but is not limited to, a data schema with various attributes, values, relations, and descriptions pertaining to the real-world entity. In general, a profile can be considered to be a document about an entity. A collection of profiles is sometimes called a "knowledge base." A profile may also or instead describe multiple entities at the same time. A profile describing multiple entities may focus on one or another of the entities, or on the interactions between various entities. In general, a profile is a document that describes one or more entities.

By way of example, a profile of a person is a common type of record in a knowledge base. For example, Wikipedia has many articles about living people and deceased people. Also, LinkedIn, Facebook, Twitter, and the like, offer forms of profiles about people; such social networking sites provide a special kind of profile that is typically curated and controlled by the person or company described by the profile. In other systems, such as a contact manager application like SalesForce.com, users may maintain profiles of other entities, typically people and organizations.

Profiles describing electronic-document-type entities, such as photographs or movies, are another example of a type of profile. For example, in assessing a photograph of an Olympic athlete, an author might describe the context in which the photo was taken.

As a semistructured document, a profile may contain both structured and unstructured information. As shown in many online knowledge bases, such as Wikipedia, LinkedIn, MusicBrainz, and the like, schematized entity attributes may be presented in an "infobox" (or similar) displayed prominently in the profile, which includes basic information regarding the entity. The parts of the profile may be substantiated with citations to source documents, which are typically outside the knowledge base. A profile may also include unstructured information in the form of natural language text or audio or video describing the entity or recorded from the entity described by the profile.

A profile need not be stored in a knowledge base. Profiles stored in knowledge bases often link to other profiles in the knowledge base. Whether stored in a knowledge base or not, a profile may link to other profiles in multiple knowledge bases. A profile may link to profiles describing related entities or to other profiles describing the same entity as the subject profile. Such links may indicate cited sources of information or relationships to other entities. But a profile may more generally be stored in a text document, HTML document, or any other document, file or other persistent object in volatile or non-volatile storage that can be used as a live, in-progress document for a user who is investigating the entity. This profile may include a document identifier that can be used to share, copy, retrieve, or otherwise process the persistent profile.

A profile stored in an in-progress document in this manner may facilitate recursive look ahead where results presented to a user are updated based on changes to the in-progress document, and a user may pull content from results and place the new content into the in-progress document to further refine the profile. Refining the profile may include adding new information, recording citations that substantiate information that is already in the profile, taking note of contradictory information about the entity, filling in previously missing information, or otherwise making sense of the entity and information about the entity. These queries may be highly structured and may be performed around the explicit or implicit structure of the in-progress document, as well as information contained in the unstructured portions of the semistructured in-progress document. It should also be noted that the profile stored in this in-progress document relates to a specific entity or topic that is the target of the user's enquiry, and that query target does not change throughout the iterative refinement contemplated herein. While the system may not know initially if the profile is for a general topic or a specific entity, this target topic or entity does not change during a session. If a user wishes to create a profile for a different target entity or topic, then this is accomplished through the creation of a new in-progress document.

As used herein, the word "live" may also refer to an in-progress document, because the user's experience of the document is that it is living and changing as the user (and the user's collaborators) work on improving and organizing the information in the document.

As mentioned above, entities may have specific properties known as "entity attributes," or simply "attributes." These attributes are discussed in more detail throughout this disclosure.

Although entities can be topics, not all topics are entities. A topic is an entity if and only if it has a type and is distinguished from other instances of the same type by specific attributes, values, relations, and the like. Topics are often expressed using strings of natural language text or semistructured text, such as keyword queries, exemplar passages, or prose descriptions. A semistructured description of a topic may use Boolean operators such as AND, OR, and NOT, or regular expressions such as Perl Compatible Regular Expressions (PCRE), or other pattern description language or query expression syntax to restrict or expand or specify the information that is relevant to the topic. The notion of relevance assists in understanding the meaning of a topic. For example, two people might have different subjective interpretations of the meaning of a topic, and this becomes evident in the way two different people view pieces of semistructured data in relation to the topic. One person may judge a piece of semistructured data to be highly topical, or "on topic," and another person may regard it as "off topic." Thus, topics generally have more subjective and amorphous attributes, where the well-defined attributes of an entity often eliminate such subjective discrepancies.

A first document 302 may be any source document used to create an entity profile such as the second document 304. As used herein, the term "document" should be construed broadly to include any files or other persistent data repositories that can be stored on computers and searched for information related to an entity including without limitation text files, spreadsheets, presentation files, multimedia, and so forth. Documents may be unstructured, semistructured, or structured as discussed herein. A document may generally describe or contain information relevant to an entity. In general, the document may contain a document identifier for locating or referring to the document such as a filename, a title, a resource address or a path in a network or file system. The document may also include one or more entity identifiers that identify the entity referred to.

The first document 302 may generally include data relating to a topic identified by a topic identifier 310. For example, the first document 302 may include one or more passages 312 addressing the topic and including information about the topic. A passage 312 may in general include any subcomponent of a document. In addressing the topic, the passage 312 may include a variety of textural references such as an entity identifier 314, an entity mention 316, and a citation 318.

An entity identifier 314 may include any mechanism for referring to a particular entity, e.g., an entity identified by the entity identifier 320 that is the focus of the entity profile 308 included in the second document 304. Entity identifiers 314 may include data elements that can be interpreted to unambiguously specify a particular entity, such as a list of distinguishing attributes or a pointer to a record in a database that holds such lists of distinguishing attributes. For example, a URL can identify an entity. The entity identifier 314 may also be a human-readable identifier such as a name, title or textual description that identifies a particular entity.

An entity mention 316, or simply a "mention," may include a substring of an unstructured document or field in a structured document that refers to an entity, e.g., the entity identified by the entity identifier 320 that is the focus of the entity profile 308 included in the second document 304. However, the context surrounding the entity mention 316 may or may not be sufficient to unambiguously identify a particular entity. The context surrounding an entity mention 316 may include a larger span of natural language prose near the entity mention 316 substring and other more structured elements of the document 316 that can aid in disambiguating the entity referred to by the entity mention 316. Automatic algorithms that use context windows often use a sentence boundary detecting algorithm to select a range of, e.g., three to five sentences surrounding an entity mention 316. Such a passage surrounding a mention carries information that a human would similarly use to learn distinguishing attributes of the entity that is mentioned.

If a document refers to an entity multiple times, then the sequence of those mentions may be connected to form a set of mentions referred to as a "coreference chain" or "coref chain." The context windows surrounding each mention in the chain can be used together to provide more distinguishing information for a human reader or automatic algorithm to disambiguate which entity the author intended to reference. In general, a within-document coreference chaining algorithm considers which mentions from a single document are referring to the same entity, while cross-document coreference resolution algorithms determine whether mentions from different documents are referring to the same entity.

An entity mention 316 need not explicitly contain the name of the intended entity. Instead, an author may use a description of the entity. For example, in the passage, "the three journalist got off the plane, and then they were interrogated," the sub string "the three journalists" is a type of entity mention known as a "nominal" mention because it uses only a noun phrase to refer to the entity, while the substring "they" is a pronominal mention, i.e., a pronoun.

A citation 318 may include a reference from one document to another document. For example, the citation 318 shown in the first document 302 may reference the third document 306, while the citation 322 in the second document 304 references the first document 302. The citation 318 may be implemented using a hyperlink near or on data that was obtained or copied from the referenced document, or the citation 322 may be a human-readable citation such as a textual reference to a book, newspaper, journal or other content source. In the context of a knowledge base, a citation 318 is typically a link to a page outside of the knowledge base. This provides evidence for the text or other data that is associated with the citation 318. Gathering citation-worthy documents that substantiate or corroborate information in an entity profile is a common task for authors of in-progress documents.

The second document 304 may include an entity profile 308, e.g., using data obtained from the first document 302 and the third document 306. The second document may be an in-progress containing semistructured data that describes an entity identified by the entity identifier 320. The second document 304 may include a document identifier 305 that can be used to save, retrieve, share, or otherwise process or persist the document.

In general, the second document 304 may include a number of attributes 324, 328 and subtopics 340 used to describe the entity. For example, the second document 304 may include a first attribute 324 with a number of values 326 and a citation 322, e.g., to a source of the information for the first attribute 324. More generally, the attributes in the second document 304 may include one or more properties, traits, characteristics, details, features, relationships, and so forth, of an entity, and various schemas or folksonomies may capture such attributes 324 in a representation of the entity.

In one aspect, a second attribute 328 may include a relationship containing a second entity identifier 321 for a second entity, along with a type 330 of relationship between the entities. Entity relationships may, for example, include a social graph for an individual or a subsidiary or parent for a corporation. These relationships may be untyped, or they may have a specific type 330 such as "spouse" or "father" or "business partner." In some contexts a relationship may instead refer to a subtopic. For example, President Barack Obama has a relation to the foreign policy of the United States, which is a general topic, and in the context of the president, also a subtopic. The President also has a relation to his daughters, each of which is an entity. In contrast to the relation with his daughters, which is a well-structured entity relation, the relation to the topic of foreign policy of the United States is complicated and may be described with more complex, semistructured data. Some attributes 324 may change over time, while others may be permanent, e.g., changing only when an error is identified in a prior recording of the value for the attribute 324.

The entity attributes 324 may be well-defined, meaning they include attribute values 326 specifying particular things. By way of example, for a person (the entity "type"), the attributes may include a first name, a last name, a date of birth, a place of birth, a social security number, a passport number, an e-mail address, a telephone number, a current address, an employer, an entity identifier for mother, father, and other relatives, a height, a weight, a marriage status, an entity identifier for spouse, and many other structured or semistructured fields. The values 326 may include information pertaining to these attributes 324. For example, a person's gender attribute may have the value male or female, and a height attribute may have a value measured in meters or inches. Other examples of attributes for entities of other types may include, e.g., a number of employees and headquarters for a company, the atomic mass and melting point for a chemical compound, and so forth.

The values 326 of attributes 324 may thus specify particular things (e.g., home address, name, occupation, gender, birth date, etc.), include particular types (e.g., number, date, time, text, filename, path, image, audio, etc.), and/or include a pointer to another attribute 324 or entity identifier 321. Each value 326 may be a piece of information or data that defines the attribute 324. For example, if an entity is a company, attributes 324 may include the headquarters and the number of employees, where the value 326 for these attributes 324 is the city and state of the company's headquarters and the actual number of employees, respectively. If the entity is a chemical compound such as sodium chloride, attributes 324 may include the chemical formula and the common name for the chemical compound, where the value 326 for these attributes 324 is NaCl and salt, respectively.

Subtopics 340 may include any semistructured data as contemplated herein, similar to any other topic, except that each subtopic 340 is predicated on being about a particular entity. Thus each subtopic 340 may capture an idea or piece of information about an entity. These subtopics 340 are generally intended to capture the imprecise way in which a user might collect information about an entity, and to this end they permit the accumulation of semistructured data from a variety of sources having a particular relationship to the entity.

A named entity provides another useful example. "Named entities" may include a special subclass of topics that are distinguished by having a name and entity type. Individual instances of a type of named entity, such as persons, may have strongly typed attributes 324 that distinguish them from other individuals of the same type. For example, in general people have different family members and different hometowns, birth dates, social security numbers, and so forth. These attributes 324 are "strongly typed" in the sense that values 326 of these attributes 324 have a specific data type and a specific meaning. For example, a birth date has a known meaning—the day someone was born—and a specific data format as a date. Similarly, a postal zip code has a particular numerical format as a five digit or nine digit representation with specific meaning through a predetermined mapping to local postal regions.

When studying an entity, it is often helpful to gather distinguishing attributes of the entity in order to disambiguate which mentions in a corpus of data refer to the entity in question. Entity types may include extrinsic properties of entities that are defined by various observers of entities. Any given observer may describe a given entity as being an instance of several different entity types. For example, some observers may include "leader" as a type of entity and these observers might describe Barack Obama as being both a person-type entity and a leader-type entity. Taxonomies of entity types can be quite deep and complex. For example, a weapons manufacturer may separately delineate every variety of handgun. Meanwhile, another taxonomy might simply refer to all guns as one entity type. Therefore, entity type can be a useful description that helps distinguish entities from each other.

Other attributes of an entity may be intrinsic, such as its mass at a particular time. Often, the reason for listing or recording attributes of an entity is to distinguish the entity from other entities with which it might share some aspects, subtopics, or attributes. Entity types may play a particular role in distinguishing entities, because observers often associate schemas of distinguishing attributes with entity types. For example, the distinguishing properties of a handgun-type entity can include the caliber of the bullets it uses, its manufacturer, its model number, and possibly a serial number, to name a few. In contrast, the distinguishing properties for a company-type entity can include its name, its headquarters location, where it was of incorporated, the names of its senior executives, and so on.

In one aspect, the second document 304 is an in-progress document. That is, during the time period in which the document is being changed, the document may be considered to be in-flux or in-progress. By way of example, note taking is an activity that records observations in an in-progress document. In one aspect, a second document 304 may be considered in-flux or in-progress while waiting for new information to arrive or become available to an editor who could update or refine the document with that new information. In an entity profile as contemplated herein, a change in the second document 304 may update a search for information regarding an entity described by the entity profile. A user might gather distinguishing attributes about an entity of interest and record them in an in-progress document.

The third document 306 may be a co-referent document to the first document 302, i.e., where the entity identifier 314 in the third document 306 refers to the same entity as the entity identifier 314 in the first document 302. The process of detecting that two or more mentions refer to the same thing is referred to as "coreference resolution" or "coref" for short. Resolution of mentions to entities is "entity coref." Resolution of mentions of relationships between entities is "relation coref," and so on.

Coreference resolution does not require a profile or a knowledge base. By transitivity, all mentions that refer to the same entity can be coreferent, where they form an equivalence class. Resolving whether a mention is coreferent with an entity profile is often easier than resolving whether mentions from other types of documents are coreferent, because entity profiles tend to explicitly provide rich information that distinguishes the entity. This information can be used to disambiguate which mentions from source documents refer to the entity in the profile. Connecting mentions to a profile is referred to as "entity linking."

A preferred embodiment includes entity-centric systems and methods that exploit the known attributes of a particular entity type. Using this information, a suitable entity profile can be constructed, and attributes can be implicitly or explicitly identified within the profile to assist in distinguishing the entity and finding additional relevant information. By accepting an entire entity profile as a query, an entity-centric search engine can allow users to express both which entity interests them and what they currently know about the entity. These two aspects of a query facilitate the identification of the most relevant, and potentially most differentiated, search results from among a target set of unstructured or semistructured data.

Query results may be organized or refined using numerous techniques that can provide one or more of the following: gathering mentions that refer to the target entity; grouping together mentions of the entity that appear to carry redundant or equivalent contexts; reordering or scoring of search results (e.g., within a set of coreferent mentions to favor new or surprising contexts).

On the other hand, searching for information about entities introduces different challenges. In particular, a user of a search engine can typically say with high confidence whether a result refers to their entity of interest or not. The boundary between correct and wrong is generally quite sharp, and thus the user's experience in working with an entity-centric search engine can be more sensitive to false positives than is the case in the vague realm of general concepts/topics. Further, the algorithmic task of grouping together all mentions to each entity in a large data set typically takes significant computational power and exhibits a diverse range of error conditions, including: failure to detect mentions of interest in a corpus; failure to combine groups of mentions to the same entity; failure to split groups of mentions to different entities; failure to detect that a context window carries new information about the target entity; failure to detect that a context window carries no new information about a target entity; failure to discover key facts, events, attributes, relations, activities, patterns of relevance to a particular entity; and the like. The algorithms discussed herein may address one or more of the foregoing error conditions. In one aspect, feature vectors may be usefully employed to analyze documents and data contained therein.

Feature vectors may be constructed from data that is about a topic, such as an entire text document or passage. Feature vectors may also be constructed from context windows surrounding mentions in a coref chain that refers to an entity. A feature vector constructed around one or more mentions of an entity differs from a feature vector constructed from an entire document or passage in that the former has anchoring phrases (the mention(s)) and the latter does not. These anchoring phrases are the name mentions, nominal mentions, and pronominal mentions in the coref chain. When an automatic algorithm is used to nominate mentions for inclusion in a coref chain, it may make errors, e.g. by failing to include a mention or by incorporating a phrase that is not a mention to the same entity as the other phrases nominated into the chain. A single document typically contains mentions to multiple entities, and therefore multiple feature vectors anchored on entity mentions can be constructed from that one document.

A feature vector constructed specifically around mentions of an entity is called a mention feature collection or "MFC." A feature vector constructed from a passage without anchoring mentions is called a topical feature collection or "TFC." A feature vector constructed from a profile of an entity, which is a document focused on a particular entity, is called a profile feature collections or "PFC."

Given feature vectors for two or more pieces of data, one can compute several kinds of comparisons. Two important types of comparisons are: (1) similarity comparisons that quantify the degree of sameness between two feature vectors, and (2) dissimilarity comparisons that quantify the differences between two feature vectors. Comparisons between various components of a feature collection are easy to construct. For example, for string count vectors, a common comparison is the cosine of the vectors, which is normalizing both vectors to have unit length and computing the dot product between the two unit vectors. Since counts are positive, the resulting value ranges between 0 and 1, with 1 indicating that the two vectors have exactly the same words with the same count values, and 0 indicating that no overlap. A variety of other comparison functions are common in the art. For example, counting the number of strings that appear at least once in both feature vectors.

Particular components of feature vectors may be compared with each other separately. For example, the mention portions of two MFCs can be compared with cosine, and the CO-PER portions can also be compared separately from the mentions portion. The resulting values can be combined in a weighted sum. For example, if the weight on the mention comparison is 8 and the weight on the CO_PER comparison is 2, and the similarities for the two components are 0.6 and 0.3, respectively, then the weighted sum is 5.4.

When comparing two TFCs, the degree of similarity indicates whether the passages are describing similar topics. When comparing MFCs or PFCs, the degree of similarity can indicate whether the mentions and/or profiles are describing the same entity, i.e. whether they are coreferent. Emphasis is placed on the word "can" in the previous sentence, because not all components of a feature vector are useful for measuring likelihood of coreference. Given a set of mentions that have been partitioned into a set of coreferent sets, one can apply standard machine learning techniques, such as logistic regression or stochastic gradient descent, to learn a vector of weights on the similarity comparisons of the various components of feature vectors built around each mention. Such a process considers the observed similarity values between the coreferent and non-coreferent examples provided by the partitioning, and computes the weights that best predict those two possible states. When such a model training process works correctly, portions of a feature vector that correspond to distinguishing attributes will receive higher weights, and portions that carry other contextual information that does not distinguish the reference entity will tend to get lower weights.

Such model training is common in the art of natural language processing and in cross-document coreference resolution, also known as entity disambiguation. When such a model is applied to MFCs, it is often called entity mention disambiguation. When such a model is used to compare MFCs and/or PFCs with PFCs, it is often called entity linking or wikification, because it is linking data into a reference knowledge base of entity profiles. The model output is a score or probability describing the likelihood that a human would agree that the two items are the same entity. Such models are often called pairwise models, because they operate on pairs.

Given a pairwise model, one can construct a hierarchical model by grouping together feature vectors into nested sets in which neighboring feature vectors are more similar. Such nested sets may form a tree. For each set in the hierarchy, a summary feature vector can be constructed by aggregating information from the feature collections in that subset. These summary vectors can form the interior vertexes of a tree-shaped graph in which the original input feature collections are leaf-level vertexes.

A common problem in pairwise models is that word vectors tend to be quite sparse so that MFCs that refer to the same entity can often have little or no feature overlap. With no overlap, a pairwise model has no way to detect that the two MFCs are coreferent. Since coreferent mentions form an equivalence class, the logical property of transitivity applies, i.e., A equals B, and B equals C, then A equals C. Transitivity can solve the sparsity problem, because even if A and C have no overlap, they might both overlap different parts of B such that B connects them together. By grouping together similar feature vectors, hierarchical models can be an efficient way of uncovering chains of transitivity that connect feature vectors that have little direct overlap.

Dissimilarity measurements are more nuanced than similarity measurements, because there are more qualitatively different ways for two feature vectors to differ, including: (1) two MFCs can refer to different entities, (2) two MFCs can refer to the same entity and carry different attribute information in the contexts surrounding the two chains of mentions, (3) two MFCs can refer to the same entity and carry different context words that have the same information, or (4) two MFCs can refer to the same entity and have essentially the same context words. This corresponds to (1) not coreferent, (2) coreferent and usefully different information, (3) coreferent and semantically equivalent, and (4) coreferent and syntactically equivalent, i.e. near duplicates or exact duplicates. The boundary between (1) and (2) is sharp, and gradations exist between (2), (3), and (4). Measures of dissimilarity attempt to quantify this gradation. In one aspect, entity-centric knowledge discovery as contemplated herein includes an automated ability to learn dissimilarity models that help users discover new information about an entity described in an in-progress document.

Figure 4:
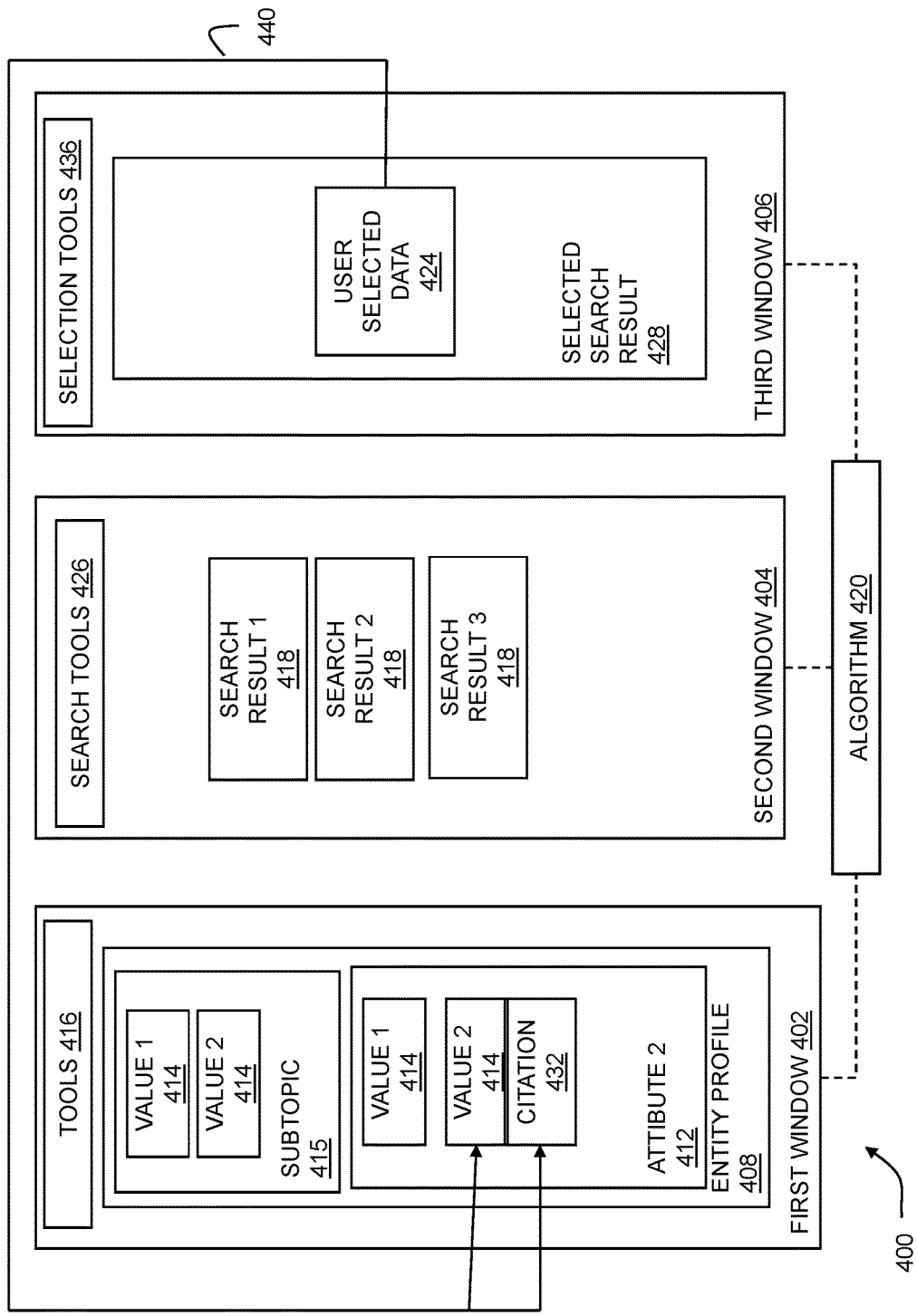
FIG. 4 shows an interface for entity-centric information retrieval and aggregation.

FIG. 4 shows an interface 400 for entity-centric information retrieval and aggregation. The interface 400 may in general be a user interface for a client device (such as any of the client devices discussed herein) that presents a user-friendly, intuitive visual display and an interactive environment for building an entity profile using the techniques described herein. The interface 400 may be displayed on a screen such as a desktop monitor, a tablet or smartphone touchscreen, or any other physical display device or the like associated with any of the client devices described herein.

The interface 400 may be arranged into a first window 402, a second window 404, and a third window 406. While these three windows 402, 404, 406 can be usefully organized around the various search, retrieval, and profile revision functions contemplated herein, one skilled in the art will recognize that more or less windows are possible without departing from the spirit and scope of this disclosure. For example, a three-window embodiment displays abstracted search results in the second window 404, and a more detailed view of a particular one of the search results in the third window 406. However, the platform may be adapted to receive user input, particularly the selection of relevant content for an in-progress document in the first window 402, directly from the excerpted results in the second window 404, thus rendering the third window 406 unnecessary. As another example, the third window 406 may be divided into multiple windows rendering a particular document in different ways, e.g., as multi-media, text only, and so forth. As explained in more detail below, the first window 402, second window 404, and third window 406 may be interactive windows functionally coupled to one another so that an action in one window can trigger responsive actions in another window or between any two windows consistent with the profile creation strategies contemplated herein.

The first window 402 may include a profile 408 (also referred to herein as an "entity profile") of a target entity stored as an in-progress document and displayed in the user interface 400. The target entity may be any entity as described herein, e.g., a person, place, corporation, and so on. The target entity may be uniquely differentiated from other entities of the same type by one or more values 414 of one or more distinguishing attributes 412, all as described above. For example, the profile 408 may initially contain only a name or similar entity identifier for the target entity, and then an author of the in-progress document can improve the description of this target entity by incorporating more attributes/values, subtopics, and other descriptive information about the entity. The entity profile 408 may be in the form of a HyperText Markup Language (HTML) document, an eXtensible Markup Language (XML) schema, a plain text document, a rich text document, a wiki document, and so forth.

It will be appreciated that the use of an in-progress document provides significant advantages over other techniques known in the art for entity-based search. For example, while keywords provide good control over attribute values (the keywords themselves) and Boolean relationships among different terms, they do not generally persist an entity description in the same manner as an in-progress document, nor do they provide convenient user control over structure, hierarchy, and content of the entity description, or any convenient manner to incorporate subtopics and unstructured data. That is, keywords may provide an implicit Boolean schema and a syntax that permits control over various search features, but a keyword search is not generally schematized or schematizable to facilitate the capture of various types and relationships of data for the entity. By contrast, foldering techniques, where documents and data are manually sorted into a hierarchy, may provide good control over the hierarchical relationship among entity mentions, but these techniques do not readily support explicit user control over the types of relationships that are being established or particular values that are assigned to various entity attributes. The in-progress document contemplated herein provides an intuitive and easily accessible manner for an untrained user to progressively refine the description of an entity in a manner that persists the entity description while permitting significant automation of background entity search tasks.

The first window 402 may include a number of tools 416 such as tools for revising the entity profile 408. In general, a user interface tool as contemplated herein may include any suitable user interface component known in the art. A tool may be implemented, for example, as text boxes, radio buttons, check boxes, drop down lists, icons, or other operable features displayed within a graphical user interface, as well as other user controls such as keystrokes, hand gesture interpretation, mouse clicks and movements, and so forth. Any such tool or control may be used to implement the various interface tools described herein.

For example, the tools 416 may include without limitation one or more of a text editing tool, an HTML editing tool, a template tool (e.g., title, headings, subheading, bullets, numbering, and so on), a citation tool, a file/data insertion tool (e.g., for inserting media, a template, a table, text, a gallery, references, special characters, and so forth), and so on. The tools 416 may also or instead include a help feature for providing a user with troubleshooting instructions and advice, a settings feature (e.g., page settings for viewing, advanced settings, and so on), a search box, and so forth. Further, the tools 416 may also or instead include tabs or the like to perform various functions such as editing various portions of the entity profile 408, taking notes, retrieving a revision history or viewing history, and so forth. The tools 416 may also or instead include any other features known in the art.

The second window 404 may be concurrently visible with the first window 402, and may display a plurality of search results 418. The search results 418 may be located and retrieved for the target entity based on the entity profile 408 in the first window 402 using an algorithm 420 to traverse a data network or other source(s) of data. The algorithm 420 may rank the search results 418 according to whether they refer to the target entity 410, and may further sort, filter or rank using any suitable criteria such as whether a particular result provides a new item of information for the target entity 410. The search results 418 may be displayed with a preview of pertinent information included in the particular search result 418, such as highlighting or otherwise emphasizing keywords or other relevant text within a window of surrounding text, where the keywords are specified by the user or determined by the algorithm 420. A variety of entity-centric search techniques are known in the art and described by way of non-limiting examples in of U.S. Prov. App. No. 61/996,575 filed May 12, 2014, and U.S. Prov. App. No. 62/070,549 filed Aug. 28, 2014, the entire contents of which are incorporated herein by reference.

The algorithm 420 may use the entity profile 408 as a query for retrieving, ranking, and displaying the search results 418. One possible approach to implementing the algorithm 420 is to construct a feature vector for the profile 408, such as the PFC described above.

In general, a modification to the entity profile 408, either through direct textual input from a user or by extracting information from other documents as described below, permits an updated search by the algorithm 420 and presentation of new search results 418 in the second window 404. By way of example, a modification to the profile 408 may be represented as modifications to a PFC derived from the profile 408, which can be used as the basis for a new search. In one embodiment, the search results may be automatically updated when a change is detected to the in-progress document. In another embodiment, the interface 400 may provide a tool or control for the user to manually trigger a new search that refreshes the search results 418 according to the current entity profile 408. Thus the search results 418 may be automatically or manually updated in response to removing information from the profile 408, adding information to the profile 408, changing information in the profile 408, highlighting (or otherwise interacting with) information in the profile 408, highlighting (or otherwise interacting with) information in one of the search results 418, and so forth. In this context, a variety of tools may be provide for a user to provide indications of interest or emphasis such as highlighting, bolding, color coding, underlining, italicizing, and so forth. Thus, in an aspect, the second window 404 may be responsive to a user action or interaction, such as a user selection of information from the first window 402, that indicates user interest by updating a search result 418 in the second window 404 according to the inferred indication of user interest.

In one aspect, the algorithm 420 may incorporate active machine learning that applies the user's actions and interactions to compute new model weights for comparing feature collections.

In another aspect, the second window 404 may include search tools 426 to facilitate user control of the algorithm 420 and the quantity and quality of search results 418 that are returned. For example, this may include tools for selecting content sources, filtering search results, selecting search algorithms or search engines, weighting objective search functions, and so forth. While search results 418 may include documents or excerpts from documents believed to be relevant, the search results 418 may also or instead include other data or metadata responsive to an entity profile. For example, in an implementation using feature vectors as described above, each search result 418 may represent a feature collection built from a mention coref chain in a document or each search result 418 may represent profile feature collections from other entity profiles. In one aspect, the search tools 426 may include tools for selecting the type of search result(s) 418 to display.

The third window 406 may be concurrently visible with the first window 402 and the second window 404, and may display content of one of the search results 418, i.e., a user-selected search result 418 (shown as the first search result 418 in the figure, where a bold box 432 surrounds the search result 418 thereby indicating it is selected). In general, the first window 402, second window 404, and third window 406 may be operatively coupled between one another for, e.g., updating the entity profile 408, providing updated search results 418, displaying updated content, and so forth. For example, the first window 402 may be operatively coupled to the third window 406 (or optionally the second window 404) to receive a user selection of selected data 424 from the third window 406 and to place the selected data into the first window 402 thereby providing a change in the profile 408, and the second window 404 may be responsive to a change in the profile 408 to update the search results 418, and the third window 406 may be responsive to a selection of a selected one of the search results 418 in the second window to display content of the selected one of the search results 428 in the third window 406. In this manner a user can progressively and iteratively refine the entity profile with the assistance of entity-based search algorithms 420.

The third window 406 may include highlighting or other visual emphasis of mentions of the target entity 410 in the selected search result 428. The third window 406 may also or instead include highlighting of new items of information in the selected search result 428.

In one aspect, the first window 402 is operatively coupled to the third window 406 to receive a user selection 424 of data from the third window 406 into the first window 406 thereby providing a change in the entity profile 408. The selected data may include text, hyperlinks, data, or any other type of data in the source document, and the data may be selected and moved using, e.g., a drag and drop, a copy and paste, or any other suitable user interface tool for transferring data into the first window. This selection and movement of data may also carry an annotation or the like that can be included in the profile in the first window. Thus for example, a hyperlink to the source document may automatically be included in text that is inserted into the profile, or a footnote or the like may be created including an active or passive link or pointer to the source document.

The second window 404 may respond to the change in the entity profile 408 by updating the search results 418 according to the revised entity profile. This may be in response to manual editing of the entity profile 408, or drag and drop revisions or the like as described above. The third window 406 may similarly be responsive to a selection of one of the updated search results 418 in the second window 404 to display content of the selected one of the search results 418 in the third window 406.

The third window 406 may display a user-selected one of the search results 428 in greater detail, e.g., by rendering the full text, embedded media, rich text, hypertext, and so forth within the search result 428. Where a user has not yet selected one of the search results 418, the third window 406 may default to a display of a first or highest-ranked one of the search results 418, or may display nothing. The tools of the interface 400 may include selection tools 436 supporting drag and drop functionality, or other interactional functionality to facilitate ease of use. For example, a selection of user-selected data 424 within the third window 806 may permit a drag and drop of the user-selected data 424 from the third window 406 to the first window 402 as generally indicated by an arrow 440. This drag and drop action may automatically create a citation 432 for information added to the entity profile 408 referencing the search result 418 containing the user-selected data 424. The drag and drop action may also or instead create a wiki reference tag or other computer-readable or human-readable reference to the source document. In another aspect, the drag and drop action may identify a subtopic or entity attribute in the entity profile 408 that is substantiated by the user selection 424 of content, either automatically or by linking specifically to a location in the entity profile 408 where a user places the user-selected data 424. The drag and drop action may also or instead create a text entry in the entity profile 408 corresponding to the user selection 424 of content from the third window 406, or other reference, annotation, or the like.

In another aspect, the interface 400 may also or instead provide the interactive functionality described above using only two windows, specifically the first window 402 and the second window 404. In this aspect, instead of incorporating user-selected data 424 from the full document display of the third window, the user may select the data directly from the search result(s) 418 displayed in the second window 404. This action may similarly create a citation 432 that identifies the source document represented by one of the search results 418. For example, in an implementation that uses two windows, the text selected by the user may be the teaser text that is typically displayed in a summary listing of search results, or a user selected substring of such teaser text. Teaser text is also often called excerpt text.

When a user incorporates information from a result 418 into the profile 408, that result may no longer useful to the user. The user can either remove the search result 418 from the list (e.g. using the search tools 426) or refresh the list of search results 418 in the second window 404. The algorithm 420 may, if suitably configured, remove or deprecate this result because it contains no new information about the entity described in the entity profile 408. If a result is not about the entity the user can mark the search result 418 as wrong or irrelevant, e.g., using the search tools 426. If a search result 418 is about the target entity but does not provide new information, then the user can mark the search result 418 as redundant or "not new." When a search result 418 or data in the search result 418 is redundant with information (e.g., attributes 412 and values 414, subtopics 415, and so forth) already in the profile 408, then the user can drag and drop that result 418 or user-selected data 424 into a subtopic 415 to record the subtopic equivalence. Subtopics and subtopic equivalence are further described below.

When a user starts working on a new entity profile, they typically start with only a name of the entity or possibly another attribute of the entity. As the user gathers more information, they can iteratively expand an entity profile such as the profile 408 in FIG. 4 to contain more information. Thus the profile may generally go through various stages of maturity or refinement as the use gathers and organizes information about the entity. For clarity, we name three stages of a profile here: (1) a stub profile has enough information to identify candidates to whom the user might intend to refer but not enough to strongly distinguish which, (2) a summary profile contains enough distinguishing attributes that another human can use them to easily disambiguate which entity the author is studying, however most source documents contain additional information that is not yet in the profile, and (3) a deep profile has enough different perspectives and subtopics about the entity that most source documents fall into one of the subtopics that is already expressed in the profile. A subtopic is a special type of topic that appears within an entity. A subtopic relates to a specific entity and is conditioned or predicated on the existence of that entity. For example, if a person is a folk musician and also a Celtics fan, then those two aspects of that person's life are different subtopics. The delineation of most subtopics is subjective and potentially less amenable to automated classification and management as, e.g., entity coreference. That said, entity attributes are a form of subtopic, and are strongly typed.

At different stages in the development of the profile, a search engine may employ different strategies for helping the user create a deep profile. In one aspect, when the profile is a stub, the search engine may present a diversity of different mentions that refer to different entities that have something in common with the attributes available in the profile. For example, if only a name is provided, the search engine might present results about several different entities with the same or similar names.

In one aspect, when the article is a summary, the search engine may present results that are highly likely to be coreferent and also dissimilar from each other, so as to provide a diversity of result. Diversity is a standard concept in information retrieval, and refers to the amount of new information that a particular reference provides. The system combines diversity with entity coreference to present results that are on the topic of an entity while also being diversified across different aspects of the entity.

In one aspect, as an in-progress document matures from a summary to a deep profile, the structure of the profile itself supplants the results, because user actions have consumed the results into the profile. The standard concept of diversity from information retrieval should correspondingly evolve: to achieve diversity in results, the search engine must present items that differ not only from each other but also from the subtopics that are already expressed in the profile. By treating the evolving profile embodied in the in-progress document as a new query, the nature of the information retrieval objective is changed.

This change also enables new forms of active machine learning. In one aspect, the results pulled into the in-progress document by a user can provide training examples for learning weights for pairwise entity coreference models. This approach allows learning a pairwise coreference model for each entity with a profile, or for many entities without, of course requiring specific knowledge by the user about the nature or existence of the pairwise entity coreference models being used. In another aspect, the semistructured components of the in-progress document, such as sections, subtopics, and citations, can be used as classifier targets for a model trained for the specific profile. Such a classifier can be applied to MFCs that are likely to be coreferent, and can predict whether a user would view a particular result as redundant with an existing part of the profile or might view it as new information that fills in a knowledge gap, and therefore is useful to add to the profile. Since this structure emerges as the user builds up the in-progress document, this notion of relevance actively evolves with the profile.

A specific use case for the user interface above is now provided by way of a non-limiting example is described here. Imagine that as a user you are interested in the entity President Barack Obama. You start creating a document with a document identifier, such as http://diffeo.com/kb/Barack_Obama, and put the name "Barack Obama" into the document. This name is the first subtopic in the profile article. The entity's name is a subtopic with a schema, so it is an attribute. In the case of the entity's name, the schema is simply a string and its usage is the familiar meaning of a name for a thing. The entity type is person, and this could optionally also be added to the text of the in-progress profile. In MediaWiki-based tools, such as Wikipedia, the entity's name goes into the "title" field and becomes part of the URL.

At this point, the only information provided by the in-progress document to the recommender engine is the name, so the recommendation engine might not have enough information to fully disambiguate the user's intended entity from other entities that also have that name. For example, if the user starts a document with the attribute name="Robert Smith", then the system may have access to documents that refer to many different people that have that name. Such a group of entities is called "confusable" because they share one or more attributes in common. Given the sparse information available from such a profile, when the system recommends source documents for the user to view, it orders the recommendations to present several different possible entities in the top few results. This form of diversity at the level of the entity enables the user to more quickly find a mention of the particular entity that they want to study. For example, if the system were to present results ranked by popularity of the entity, then the top many results might all refer to the same entity, which would be less useful to a user interested in a less famous person with the same name. By presenting a diverse selection of entities mentioned in the first few results, the recommender engine accelerates the user's task of building out the initial profile. This initial phase helps the user move beyond the "stub" article stage and into the "summary" article stage.

For example, the system might recommend a document first that mentions Barack Obama the boxer from Detroit and second document that mentions Barack Obama the community organizer from Chicago and a third document that mentions Barack Obama the US Senator and a fourth document that mentions Barack Obama the President. In this list of four, the first is a different entity and subsequent three happen to be the same entity at different stages of life. As the user, you can mark the mention of the boxer as "wrong" because you recognize that mention as referring to a different entity from the entity that you wish to study. The system stores this user input in association with the document identifier 434 for the profile they are writing 408. The system can use this information in the future to make better recommendations, e.g. by not showing documents similar to the document that mentioned the boxer.

Continuing the example, the user can pull text from a document about the community organizer from Chicago and add that text to the profile. The system automatically constructs a citation in the profile that records the document identifier for the source document from which the user pulled the text. Now that the profile has some descriptive text, the system can build a richer feature vector from the profile and use that to generate better recommendations.

The system may provide a text editor or similar functionality in the first window that enables the user to edit and change the free text in the in-progress document. Common tools that enable free text entry are Microsoft Word, Microsoft PowerPoint, Notepad, emacs, Google Docs, Office Live, MediaWiki's VisualEditor, and many other text editors. A standard feature in text editors is the ability to create substructures such as sections, images with captions, multiple columns, footnotes, bolding, font changes, etc.

Once the user improves the in-progress document by typing more text into it, or pulling text from search results, or creating more structure in it, the recommendation engine has more information available for generating recommendations. With more subtopics in the profile, the system is more likely to able to resolve coreference ambiguities amongst confusable entities. When the system detects that the profile has sufficient information to unambiguously identify an entity, it switches objective functions to focus results on finding more mentions about that entity, rather than diverse results about different confusable entities. In this summary article stage, instead of showing diverse results about many related entities, the system focus on coreference correctness, as characterized by the confidence score.

The design of when and how the recommendation engine changes the display of recommendations may greatly affect the user experience of the system. For example, if the recommendation engine were to shuffle or abruptly change the results every time the user changed the profile by a single character, the display could be bewildering and hard to use. Thus, one aspect of the system allows the user to decide when to receive updated results. In this manner, the user can explicitly click "save" on the profile to store their most recent edits (or similarly explicitly perform an action to store their edits). Alternatively, the system can be configured to automatically save the profile on every small change. The recommendation changes can be automatically coupled to when the profile is saved, such that they change whenever the user saves the profile, or they can be independent of when it is saved.

In an implementation, a profile can be in "edit" mode or "read" mode. Search results can appear in both modes, and the system can be configured to update the recommendations when the user switches from one mode to the other. When in "read" mode, the profile text and other content may be immutable. When in "edit" mode, the profile text and other content may be changed. In both modes, the article can be considered to be "in-progress" because the user may engage in changing the profile when they choose.

When the system detects that the profile has changed, it can prepare new recommendations and not display them to the user until the user chooses to see the recommendations. The system can indicate to the user that new results are available, or can simply provide documentation to users that the system often has new results that they can view by triggering an update to the recommendations. The system may offer a button for refreshing the recommendations. In one aspect, the system visually indicates to the user that new recommendations are available. The new recommendations may be responsive to changes in the profile or changes in data sources available to the system. For example, if the user is editing a profile on Barack Obama, and while the user is viewing recommendations Barack Obama gives a speech that produces new content, then the system can offer this updated recommended content to the user.

The visual indication that the system has new recommendations to offer the user can take many forms: an explicit textual message displayed to the user, a count of "new" items, a colorful beacon that flashes to catch the user's attention, a partial display of new results that slightly changes the previous list without abruptly reorganizing the display in a confusing way, and so on. In one aspect, the system offers new recommendations to the user by visually indicating which parts of the profile are associated with the new results. This visual indication can take the form of highlights in the profile or alongside the profile in the vicinity of the associated content.

A common practice in writing articles is to organize the document into sections and subsections and paragraphs and other delineations that logically group related information. Some of this information may be schematizable as structured attributes and other parts may be less structured. We refer to the various groupings and sections that a user creates in a profile as "subtopics." Each subtopic is itself a topic in the general sense defined above, and it is also specifically related to the entity described by the profile document. As the author builds up such structure in the document, the system uses this structure to improve the recommendations presented in the second window 426.

For example, the user might create three sections in the article about Barack Obama: one about his work as a community organizer, a second about his work as a US Senator, and a third about his work as President. These sections may in turn have subsections and other structures, which enable the system leverages to identify and recommend source content of interest to the user. When the user selects text in a particular section or paragraph, the system can use that action to respond with more information about that particular subtopic. For example, when the user is writing in the section about Obama as President, the system might avoid documents about his role as Senator and instead recommend documents about his time as President.

Using the subtopics identified in the profile, the system can look for new information that is not yet in the profile. When the user indicates interest in finding new or "novel" information about the entity, e.g. by clicking a "find new stuff" button or dialing a slider toward the "new stuff" end of the slider, then the system may recommend content that is different from what is in the profile. For example, the system might recommend documents that describe Obama's time as a law student at Harvard. This fills in knowledge gaps in the user's in-progress document.

When the system discovers another document that appears to cover the same information as information already incorporated into the profile, the system may rank this result lower or exclude it from the listing because it is equivalent. This notion of equivalence of source material for a subtopic may take several forms. For example, a document may be a duplicate of another document at a syntactic level, or it may provide the same information in a different manner of expression, where each of these is a form of subtopic equivalence.

As the profile gains in depth and structure, the system may change the objective function used for searching once again and begin to favor relevance as more important to the user than confidence. The confidence score characterizes the likelihood that a recommendation is about the target entity. Relevance score characterize the likelihood that a recommendation is useful to the user's current question, either corroborating an existing subtopic in the document or discovering new subtopics to add to the document.

As the user gradually discovers useful information and improves the article, it evolves away from being a stub and into being a more and more complete summary of subtopics about the entity. The user might pull information from several sources. In addition to finding information in the recommendations provided by the system in the second window, the user might find data using any suitable search tools outside the present system, and insert this supplemental data into the profile either by typing from memory, or cutting and pasting, or other means of gathering knowledge into the profile.

Figure 5:
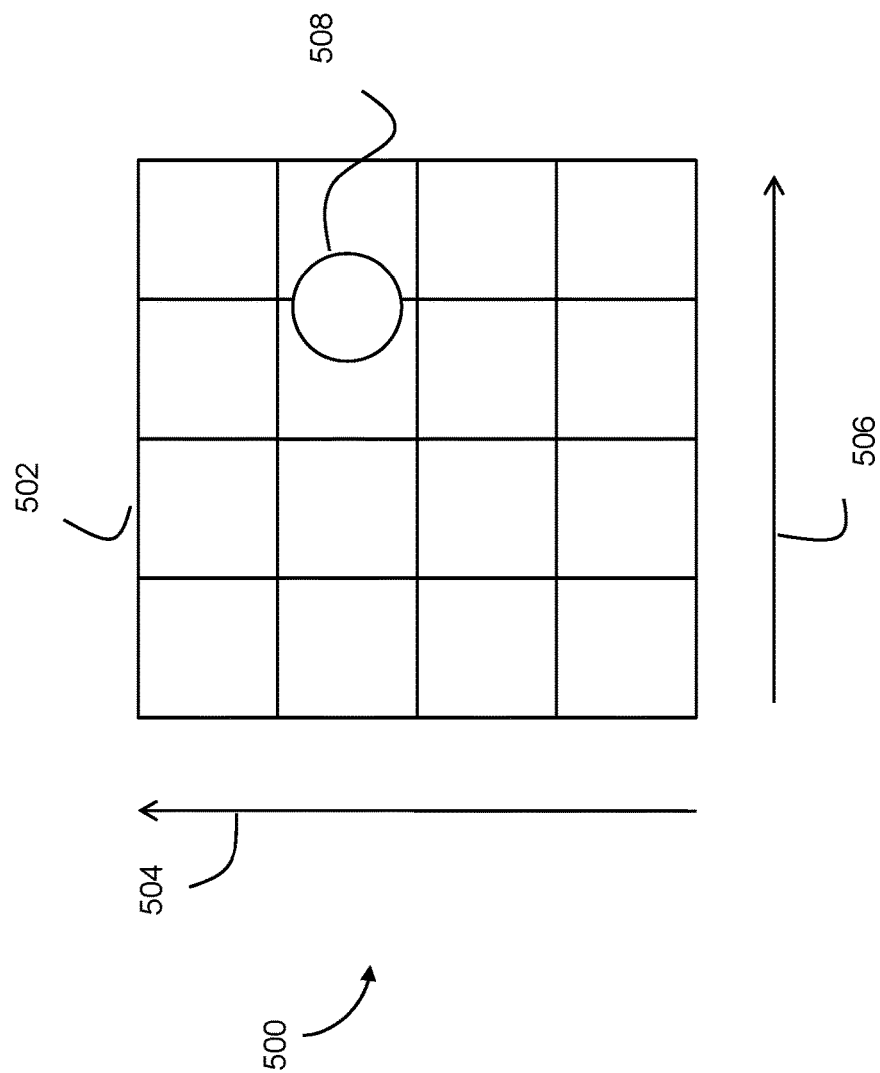
FIG. 5 shows an interface control element for trading of relevance and confidence of entity-centric search results.

FIG. 5 shows a tool for explicit user control of relevance and confidence. Relevance means the usefulness of a piece of information to a user working on a particular in-progress report. The definition of what is relevant evolves with the profile. By treating the profile as the query, the evolving relevance can be expressed explicitly to an automated system that provides the various search tools and algorithms. Another metric for evaluating content is confidence, which refers to the statistical likelihood that a human will agree that a particular entity mention is coreferent with the entity described by the profile. Relevance and confidence are different aspects of entity-centric search results, and users may wish to focus on one or the other depending on their particular goals, and depending on the maturity of a particular entity profile. Models can assign separate scores to each of relevance and confidence for a particular result relative to a particular profile, and a composite score for these values and other metrics may evolve over time as the entity profile progresses through the various stages of maturity described above.

In one aspect, a user control 500 may be provided for explicit control over the interaction between relevance and confidence as described above. This user control may be implemented, for example, as one of the search tools 426 described above, or any other user interface tool described herein. In one aspect, the user control 500 may provide two user inputs for interacting with relevance and confidence. For example, the user control 500 may include a two-dimensional slider 502 in which a first axis 504 controls the threshold for relevance scores and a second axis 506 controls the threshold for confidence scores. By selecting a particular location 508 within the two-dimensional slider 502, the user can control these thresholds.

Thus, the two-dimensional slider 502 may act as a thresholding tool. By selecting a location in the two-dimensional slider 502, the user can restrict the search results that are returned by a search algorithm to results that have relevance and confidence scores above the selected thresholds. The first axis 504 may correspond to relevance, such that moving the location 508 upward filters results to items having relevance scores over the corresponding threshold. If relevance and confidence scores range from zero to one, and the location 508 is set more than half way to the top (for relevance) or to the right (for confidence), then candidate results with scores less than 0.5 will be filtered out. In another aspect, instead of filtering results, the two-dimensional slider may provide weights for combining relevance and confidence into a single value by weighting them using the values from the slider and resorting the results based on the combined number.

Similarly, visualizations may be provided to illustrate points of commonality and difference. For example, in one aspect, highlights or other visual displays may be used to illustrate to the user points of commonality and difference between the current state of the in-progress profile and a source document recommended by a recommender engine.

Figure 6:
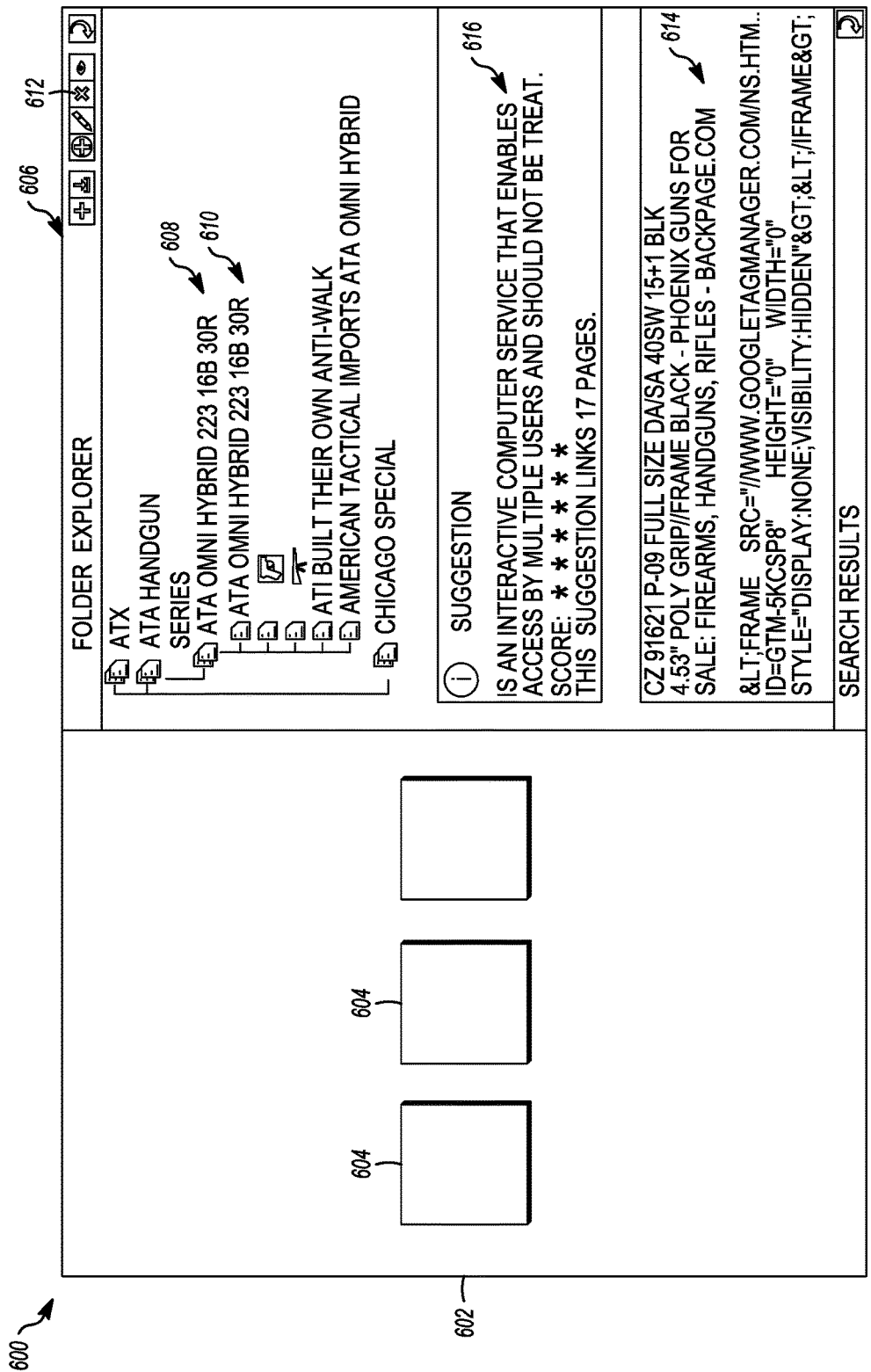
FIG. 6 shows a bookmarking tool for use in entity-based search.

FIG. 6 shows a bookmarking tool for use in entity-based search. In general, a user interface 600 may provide additional mechanisms for gathering content such as a foldering tree for bookmarking content. The bookmarking tool may operate in a Web browser as an extension that is visible when the user browses pages on a network such as the Internet or internal networks.

In general, the user interface 600 may include a web browser window 602 displaying a web page, either from the Internet or internal networks. The web page may be for a retail store that sells various products displayed as content 604 within the user interface. A bookmarking extension 606 may be provided where a user can select images, text, or other data from the web page and drag and drop that content into a folder 608 within the bookmark extension 606. Other actions besides drag and drop may also or instead be offered by the system to enable a user to associate selected content 604 with one or more folders 608, e.g., clicking buttons, checkboxes, and so forth. After bookmarking in this manner, a summary representation 610 of the user-selected content 604 appears in the extension 606. This enables the user to select the summary representation 610 for various actions, including clicking an icon 612 to direct the browser window 602 back to the page containing the bookmarked content. The extension may also show recommendations 614 from a recommendation engine that analyzes the documents bookmarked by the user and suggests other documents that are similar and may be helpful to the user. Some of the recommendations may be references to documents to view, and others recommendations may provide other information. One of the recommendations 616 may be generated from analyzing a batch of documents related to the selected item in the foldering tree and finding common properties of those documents, such as long strings in common across the texts. After finding such a common property, the recommendation engine presents the recommendation 616 to the user.

Like a directory tree in most file systems, the folders in the extension can contain other folders, thus creating a hierarchical nested structure that allows users to organize their bookmarks into a logical structure that suits their needs and thought process. We refer to this hierarchy of folders as foldering trees. Any given folder in the tree can be treated as a "root" of a subtree. A root folder contains a tree of zero or more folders below it. The user sees the so-called top-level folders presented as the roots of separate trees in the tool. Each folder has a name string that identifies the folder. Folders below the top-level have a parent folder. Folders that share a common parent folder are given unique names that distinguish them from their siblings. The user can edit the names of folders and can move folders around in the tree to curate, organize, and manage the foldering trees.

A folder in this browser bookmarking extension is not an in-progress document in the sense described herein. Rather, a folder or subfolder is merely a collection of document identifiers that the user has selected. These document identifiers point to source documents that the user could refer to via citations in in-progress reports. The information from these source documents can help develop or improve in-progresses documents. The names of folders are generally short strings and typically have a maximum width. The names are simply strings and typically can have no substructure within the string. While the user can modify the names in a file system, the folder names are not intended to be a note taking device that gets modified over time.

Thus the foldering tree structure is not an in-progress document as contemplated herein at least because it does not enable free text entry or other forms of free text note taking or similar user modifications. At the same time, it should be appreciated that, while the entity profile stored in an in-progress document as described herein is substantially different from other search techniques of the prior art such as foldering trees, these other prior art techniques may be usefully integrated into a user interface for entity-based search as contemplated herein.

Figure 7:
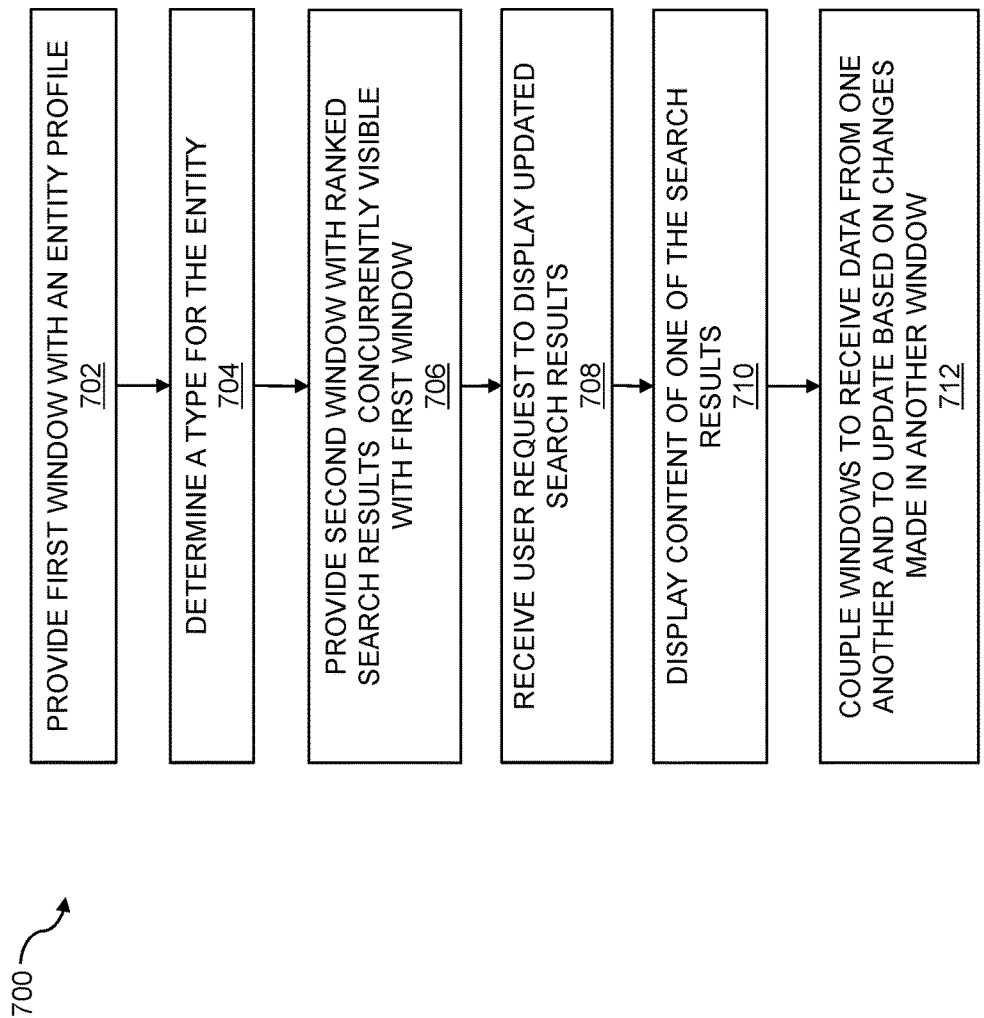
FIG. 7 shows a method for providing an interface for entity-centric information retrieval and aggregation.

FIG. 7 shows a method for providing an interface for entity-centric information retrieval and aggregation.

As shown in step 702, the method 700 may include providing a first window in a display that that accepts user input of a profile containing information about one or more entities including one or more values for one or more distinguishing attributes of the one or more entities. This may, for example, be any of the windows, displays, and profiles described herein. The profile may for example include a type and one or more distinguishing attributes associated with the type, as well as information about the entity including a value for at least one of the distinguishing attributes.

The profile may be stored in an editable document such as a text document, an HTML document, or any other document that can be persisted, receive user edits, and be identified with a document identifier as described above. The profile may include various types of data including without limitation unstructured data about the entity, structured data about the entity, data having a pre-defined data model, data without a pre-defined data model, fielded data, semantically tagged data, data having an implied structure that is not formally defined within the profile, or any other type of data. The profile may, for example, include hyperlinks, explicit fields, plain text, or other types of data. The entity may be a person, a corporation, an organization, or any other type of entity suitable for creation of an entity profile. Similarly, the entity may relate to other topics, such as a chemical composition, an animal, a geographic region, and so forth.

The first window may use any of a variety of document processing platforms or user interface tools to facilitate user modifications to the in-progress document. For example, the first window may include a text editing tool, a hypertext markup language (HTML) editing tool, and a wiki editing tool.

As shown in step 704, the method 700 may include determining a type for the entity. The type for the entity may have a predetermined schema that includes one or more distinguishing attributes of the entity. Determining the type for the entity may include providing a value for at least one of the distinguishing attributes. By way of example, one of the distinguishing attributes may include a name for the entity.

In an implementation, determining the type for the entity is a fully automated process. Determining the type for the entity may also or instead include using human input (i.e., user input), where the human input may or may not explicitly identify the type for the entity (or attempt to identify the type for the entity). For example, implementations may not require users to identify the entity type, but instead the system interprets user input to identify the type for the entity. By way of example, a user need not identify Barack Obama as being a person, but rather the system can interpret information (e.g., the name "Barack Obama," an occupation, a gender, and so on) to determine that Barack Obama is a person.

In an implementation, users of the document editor can assign profiles to one or more classes of documents that carry entity typing information with them. For example, in an aspect, a user can assign a document to a specific class (e.g., the "person" class). By associating a document to a class, the user may also cause the forms tools for adding attributes to the article to load the attribute schemas for that entity type. By way of example, Semantic MediaWiki is a tool that provides such a templating system for entity attributes and classes of entities of the same type.

As shown in step 706, the method 700 may include providing a second window in the display concurrently visible with the first window. The second window may show a plurality of search results from one or more sources that identify documents. The documents may each contain a mention with a predetermined likelihood of referring to the entity. The second window may display the search results in an order ranked using any suitable algorithm such as an algorithm that preferentially ranks at least one of the search results relative to other search results according to one or more predetermined criteria. A variety of predetermined criteria may be used for a search, such as any of the criteria discussed herein. By way of non-limiting examples, the predetermined criteria may include a likelihood that the search result refers to the entity, a likelihood that the search result provides a new item of information for the entity, or a combination of a likelihood that the search result refers to the entity and a likelihood that the search result provides a new item of information for the entity. The criteria may also or instead include any combination of the foregoing, such as a likelihood that the search result refers to the entity, a relevance of the search result to the entity, and a likelihood that the search result provides a new item of information for the entity.

The search strategy may vary over time, for example such that the method includes ranking the search results based upon the one or more predetermined criteria using a ranking function that varies according to a state of the profile, such as various points as the profile progresses from a stub to a deep profile. The second window may in general be responsive to a user selection of information from the first window to update a search result in the second window according to an inferred indication of user interest in the information.

As shown in step 708, the method 700 may include receiving a user request to display the updated search results and responsively presenting the updated search results in the display.

As shown in step 710, the method 700 may include displaying content of one of the search results as an item in the display. As described above, in order to facilitate live editing of the in-progress document based on new search results, the first window may be responsive to a user selection of the item by adding the item to the first window, thereby providing a change in the profile, where the second window is responsive to the change in the profile by offering an updated search result. The "change in the profile" can be any change, such as a text edit, copy and paste, or other user initiated change to the profile. Thus, while a user can initiate a change by dragging and dropping content from a window of search results (as explained herein), there are many other user actions that can also or instead update the profile and serve as the basis for updated search results as contemplated herein.

Offering the updated search result may include presenting the updated search result in the display. In another aspect, offering the updated search result includes presenting the updated search result in response to a user action to save the change. In other words, in an implementation, the updated search results may only be offered or presented to a user when the user saves a change in the profile. In yet another aspect, offering the updated search result includes presenting the updated search result in response to a user action requesting the updated search result, or presenting an indication in the display of an availability of the updated search result.

Updating the search results may include updating the available search results, i.e., where the search results located in the system are updated and presented to a user based on the update. The updated search result may include one or more additional items for user selection. In an aspect, the updated search result is displayed in the second window. The user selection of data may, for example include a drag and drop of the item into the first window. In this process, the drag and drop may create a citation referencing the one of the search results containing the user selection. The drag and drop may also or instead creates a wiki reference tag for the change in the profile, the wiki reference tag referencing the one of the search results containing the user selection, or the drag and drop may create a text entry in the profile corresponding to a selected text entry in the item.

Displaying the item may include displaying the item with highlighting of mentions of the entity in the item or displaying the item with highlighting of new information about the entity in the item. In another aspect, displaying the item may include displaying the item in a third window configured to display a selected one of the search results from the second window. The third window may be concurrently visible with the first window and the second window.

The method may also include providing an indication of the updated search result in the display. In one aspect, the indication of the updated search result includes a presentation of the updated search result in the second window. The indication of the updated search result may also or instead include a presentation of a notification to the user that the updated search result is available. One skilled in the art will recognize that other indications are also or instead possible, e.g., highlighting or other visual displays or cues, or other alerts (e.g., audio alerts, messaging alerts, and so on).

As shown in step 712, the windows may be operatively coupled to one another to cooperate in support of entity-based search as described herein.

Figure 8:
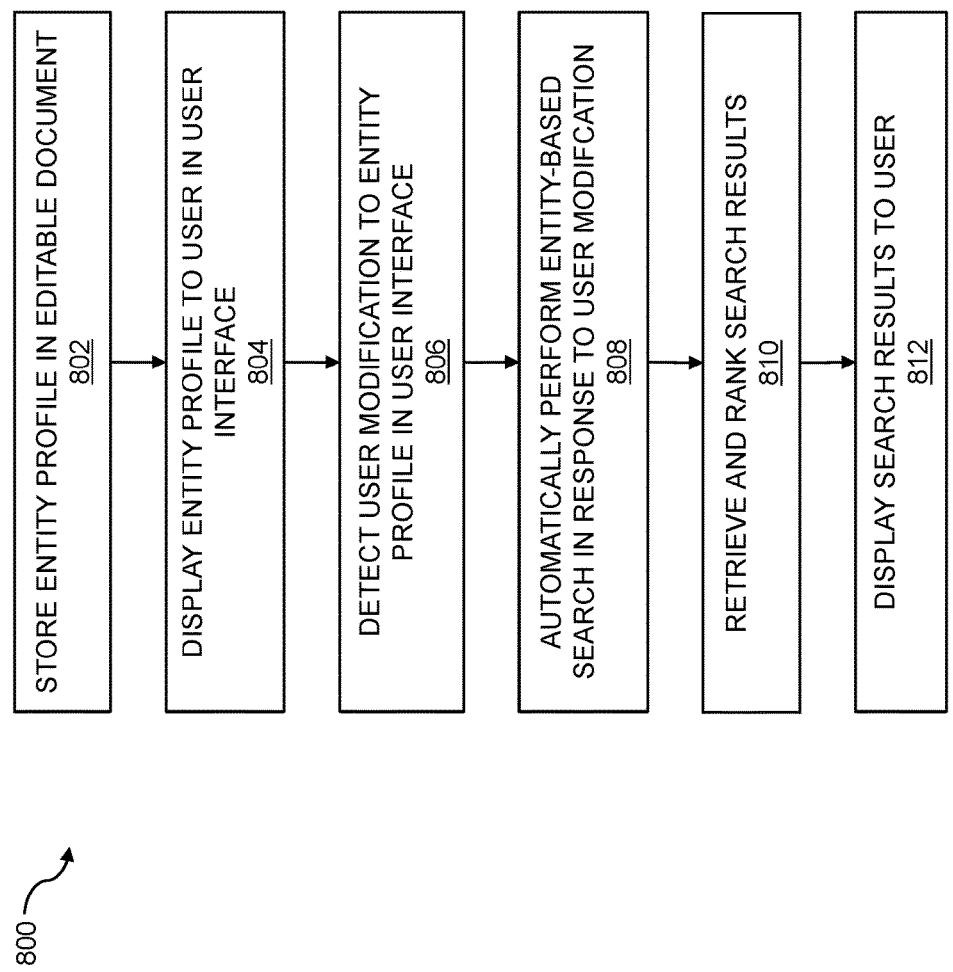
FIG. 8 shows a method for entity-centric information retrieval and aggregation.

FIG. 8 shows a method for entity-centric information retrieval and aggregation. While the method described above usefully employs a multi-window approach to organizing results and receiving user input, the underlying approach to building an entity profile as an in-progress document does not require this specific arrangement of information. Thus the approach may be usefully generalized as described by way of example in the following method.

As shown in step 802, the method 800 may begin with storing an entity profile. The entity profile may be stored in an editable document identified by a document identifier and containing semistructured data including a first datum having a pre-defined data model and a second datum without a pre-defined data model. The entity profile may, for example, describing an entity with a type having one or more distinguishing attributes, and a value for at least one of the one or more distinguishing attributes.

As shown in step 804, the method 800 may include displaying the entity profile to a user in a user interface such as any of the user interfaces described herein. The user interface may, for example, include a text editing tool for the editable document, a hypertext markup language (HTML) editing tool for the editable document, or a wiki editing tool for the editable document.

As shown in step 806, the method 800 may include detecting a user modification to the entity profile in the user interface resulting in a modified entity profile. This may be realized through any suitable software instrumentation to detect either or both of changes to the editable document or user interactions (e.g., via a mouse or keyboard) implying changes to the editable document. In one aspect the user modification may include a drag and drop of data into the editable document displayed in the user interface. The drag and drop may create a citation for the data referencing a source of the data or otherwise format the data for inclusion in the profile. For example, the drag and drop may create a wiki reference tag for the data referencing a source of the data or a text entry in the entity profile corresponding to a selected text entry in a content source. In one aspect, the user modification may include a user selection of information in the entity profile that provides an inferred indication of user interest in the information.

As shown in step 808, the method 800 may include automatically performing an entity-based search in response to the user modification for mentions of the entity specified in the modified entity profile, thereby retrieving one or more search results. This entity-based search may use any of the algorithms and search strategies described herein, including strategies that change as the profile progresses from a stub to a deep profile.

As shown in step 810, the method 800 may include ranking one of the search results. As described above, various ranking techniques may be employed based on one or more criteria or combinations thereof. Thus for example, the ranking may be according to a level of confidence that the search result refers to the entity or a level of confidence that the search result provides a new item of information for the entity. More generally, any suitable criterion or combination of criteria may be used. It will be noted that the criteria may change according to a search strategy that adapts to the level of maturity of the entity profile, or the criteria may change according to explicit user input such as a user selection of thresholds for relevance and confidence.

As shown in step 812, the method 800 may include displaying the one or more search results to a user. This may include supplemental formatting or organization, such as including highlighting of mentions of the entity in the one or more search results or highlighting of a new item of information in the one or more search results.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:

displaying an in-progress document containing user-editable information about an entity in a first window of a computer;

identifying a plurality of search results from one or more sources that identify documents each containing a mention with a predetermined likelihood of referring to the entity described in the in-progress document displayed in the first window;

displaying the search results in a second window in an order ranked according to differences from the in-progress document based on a dissimilarity measurement calculated with a dissimilarity model that quantifies differences between feature vectors for two documents;

presenting content of one of the search results as an item for display by the computer;

in response to a user selection of the item, adding the item to the in-progress document in the first window, thereby providing a change to the in-progress document; and in response to the change to the in-progress document in the first window, automatically offering an updated search result for the second window with the computer.

2. The computer program product of claim 1, wherein offering the updated search result includes presenting the updated search result for display by the computer.

3. The computer program product of claim 1, wherein offering the updated search result includes presenting the updated search result in response to a user action to save the change.

4. The computer program product of claim 1, wherein offering the updated search result includes presenting the updated search result in response to a user action requesting the updated search result.

5. The computer program product of claim 1, wherein offering the updated search result includes presenting an indication of an availability of the updated search result for display by the computer.

6. The computer program product of claim 1, further comprising code that performs the step of determining a type for the entity, the type having a predetermined schema that organizes a plurality of attributes for the type.

7. The computer program product of claim 1, further comprising code that performs the step of providing an indication of the updated search result for display by the computer.

8. The computer program product of claim 7, wherein the indication of the updated search result includes at least one of a presentation of the updated search result in the second window, and a presentation of a notification to a user that the updated search result is available.

9. The computer program product of claim 1, further comprising code that performs the step of receiving a user request to display the updated search result and responsively presenting the updated search result for display by the computer.

10. The computer program product of claim 1, wherein the order of the search results is ranked according to a combination of the dissimilarity measurement and one or more of a likelihood that a search result refers to the entity and a relevance of the search result to the entity.

11. The computer program product of claim 10, further comprising ranking the search results with a ranking function that varies according to a state of the in-progress document.

12. The computer program product of claim 1, wherein the in-progress document includes one or more of a hyperlink, an explicit field, and plain text.

13. The computer program product of claim 1, wherein the entity is selected from a group consisting of: a person, a corporation, an organization, and a chemical composition.

14. The computer program product of claim 1, wherein the user selection of the item includes a drag and drop of the item to the first window, and wherein the drag and drop creates at least one of: a citation for the change in the in-progress document, the citation referencing the one of the search results associated with the user selection; a wiki reference tag for the change in the in-progress document, the wiki reference tag referencing the one of the search results containing the user selection; and a text entry in the in-progress document corresponding to a selected text entry in the item.

15. The computer program product of claim 1, further comprising displaying the item with highlighting of one or more of mentions of the entity in the item and information in the item about the entity that is dissimilar from the in-progress document.

16. The computer program product of claim 1, wherein the second window is responsive to a user selection of information from the first window to update a search result in the second window according to an inferred indication of user interest in the information.

17. The computer program product of claim 1, wherein the first window includes one or more of a text editing tool, a hypertext markup language (HTML) editing tool, and a wiki editing tool.

18. The computer program product of claim 1, wherein the in-progress document includes a semistructured document.

19. The computer program product of claim 1, wherein the in-progress document includes data selected from a group consisting of: unstructured data about the entity, structured data about the entity, data having a pre-defined data model, data without a pre-defined data model, fielded data, semantically tagged data, and data with an implied structure that is not formally defined within the in-progress document.

20. The computer program product of claim 1, further comprising displaying the item in a third window configured to display a selected one of the search results from the second window.

* * * * *